United States Patent
Kodama

(10) Patent No.: US 11,307,729 B2
(45) Date of Patent: Apr. 19, 2022

(54) INFORMATION PROCESSING SYSTEM, INFORMATION PROCESSING APPARATUS, AND METHOD OF PROCESSING INFORMATION

(71) Applicant: Ricoh Company, Ltd., Tokyo (JP)

(72) Inventor: Kai Kodama, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/098,975

(22) Filed: Nov. 16, 2020

(65) Prior Publication Data

US 2021/0165553 A1 Jun. 3, 2021

(30) Foreign Application Priority Data

Nov. 29, 2019 (JP) .............................. JP2019-217624
Sep. 30, 2020 (JP) .............................. JP2020-166194

(51) Int. Cl.
G06F 3/048 (2013.01)
G06F 3/04812 (2022.01)
G06F 3/0484 (2022.01)

(52) U.S. Cl.
CPC ........ *G06F 3/04812* (2013.01); *G06F 3/0484* (2013.01)

(58) Field of Classification Search
CPC ...... G06F 3/04812; G06F 3/0484; G06F 8/34; G06F 8/65; G06F 9/451; H04N 1/003344; H04N 1/0035

See application file for complete search history.

(56) References Cited

U.S. PATENT DOCUMENTS

| | | | | |
|---|---|---|---|---|
| 10,467,050 | B1* | 11/2019 | Schmidgall | G06F 9/4881 |
| 2005/0246303 | A1* | 11/2005 | Kumar | G06F 16/332 706/47 |
| 2006/0129945 | A1* | 6/2006 | Dettinger | G06F 9/451 715/769 |
| 2007/0299889 | A1* | 12/2007 | Shozaki | G06F 16/93 |
| 2009/0009807 | A1* | 1/2009 | Sugi | H04N 1/00127 358/1.15 |
| 2015/0040015 | A1* | 2/2015 | Jindal | G06Q 50/01 715/735 |
| 2015/0067724 | A1* | 3/2015 | Johnson | H04N 21/4668 725/32 |
| 2016/0162601 | A1* | 6/2016 | Wohlert | G06F 3/04817 707/748 |
| 2018/0013913 | A1 | 1/2018 | Hayashi et al. | |
| 2019/0289159 | A1 | 9/2019 | Kodama et al. | |
| 2019/0324731 | A1* | 10/2019 | Zhou | G06F 8/65 |

FOREIGN PATENT DOCUMENTS

JP 2009-020878 1/2009
JP 2018-014079 1/2018

* cited by examiner

*Primary Examiner* — Claudia Dragoescu
(74) *Attorney, Agent, or Firm* — Xsensus LLP

(57) ABSTRACT

An information processing system includes a device, and a server. The server includes circuitry configured to receive, in a case of changing one application, a designation of association between a first parameter before changing the one application and a second parameter after changing the one application for the device; and in response to receiving the designation of the association, set a setting value of the first parameter for each user to a setting value of the second parameter associated with the first parameter.

10 Claims, 27 Drawing Sheets

FIG. 6

```
{
  "FlowControl": {
    "CustomParameters2": {
      "TextParameters": "My Text"
    },
    "CustomParameters3": {
      "NumberParameters": 100
    },
  },
  "OCR": {
    "executeOCR": {
      "outputFileFormat": "PDF"
    }
  },
  "GoDrive": {
    "UploadFile": {
      "FolderId": "My Folder"
    }
  }
}
```

FIG. 8

```
{
  "FlowControl": {
    "CustomParameters2": {
      "BooleanParameters": true
    },
    "CustomParameters3": {
      "TextParameters": "My Text"
    },
  },
  "OCR": {
    "executeOCR": {
      "outputFileFormat": "PDF"
    }
  },
  "GoDriveV2": {
    "UploadFile": {
      "FolderId": "My Folder"
    }
  }
}
```

FIG. 9

```
{
  "OCR": {
    "executeOCR": {
      "outputFileFormat": "PDF"
    }
  }
}
```

FIG. 13

| Workflow Application Setting | ✕ |

① Type Selection→   ② Basic Settings→   ③ Detailed Settings→   ④ Registration

Flow Parameters  Scan Settings  | Screen Settings |  User Site Settings  Terminology Settings

CHECK AND MODIFICATION OF ASSOCIATION OF PARAMETERS

PARAMETERS CAN BE CHANGED BY THIS APPLICATION UPDATING.
TO MAINTAIN USER SETTING VALUE, ASSOCIATION OF PARAMETERS IS CREATED
AUTOMATICALLY. CHECK THAT ASSOCIATION OF PARAMETERS IS CORRECT.
MODIFY AS NEEDED.

PREVIOUSLY STORED                    CURRENT CHANGE

| Parameter | | Parameter |
|---|---|---|
| Flow Control: Custom Parameters_2: Text Parameters | | Flow Control: Custom Parameters_2: Boolean Parameters |
| Flow Control: Custom Parameters_3: Number Parameters | | Flow Control: Custom Parameters_3: Text Parameters |
| OCR: Execute OCR: Output File Format | | OCR: Execute OCR: Output File Format |
| Go Drive: Upload File: Folder ID | | Go Drive v2: Upload File: Folder ID |

[ Back ]  [ Next ]  [ Update ]  [ Cancel ]

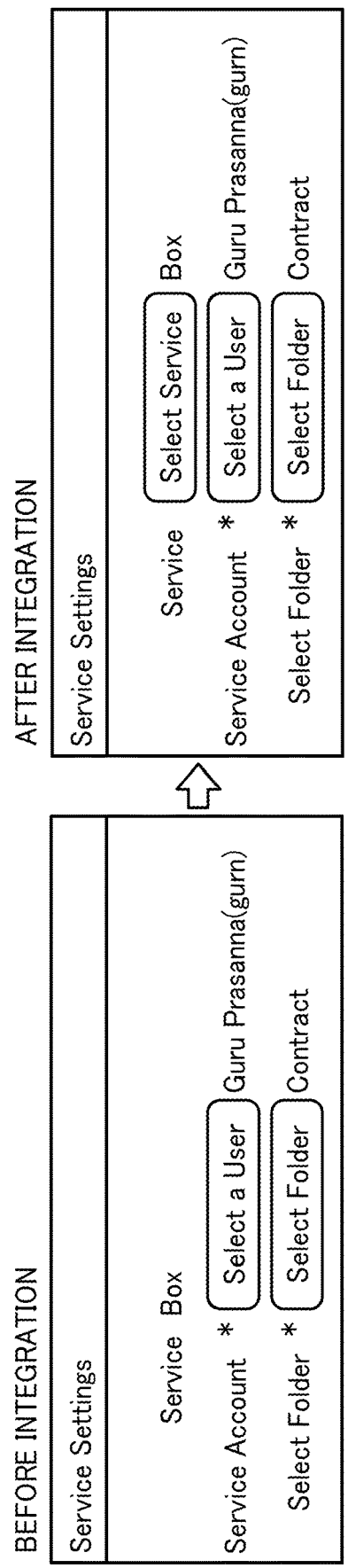

INFORMATION PROCESSING SYSTEM, INFORMATION PROCESSING APPARATUS, AND METHOD OF PROCESSING INFORMATION

CROSS-REFERENCE TO RELATED APPLICATION

This application claims priority pursuant to 35 U.S.C. § 119(a) to Japanese Patent Application Nos. 2019-217624, filed on Nov. 29, 2019, and 2020-166194, filed on Sep. 30, 2020 in the Japan Patent Office, the disclosure of each of which is incorporated by reference herein in its entirety.

BACKGROUND

Technical Field

This disclosure relates to an information processing system, an information processing apparatus, and a method of processing information.

Background Art

Services that provide functions combining multiple functions, such as scanning, printing, and e-mail transmission, have been known. For example, a server that performs certain processing on an electronic file (e.g., image file) generated by scanning and then transmits e-mail is known. Further, a technology that allows a user to create an application that performs a series of processing without a specialized knowledge of programming is known (hereinafter, referred to as application creation tool).

SUMMARY

As one aspect of the present disclosure, an information processing system is devised. The information processing system includes a device, and a server. The server includes circuitry configured to receive, in a case of changing one application, a designation of association between a first parameter before changing the one application and a second parameter after changing the one application for the device; and in response to receiving the designation of the association, set a setting value of the first parameter for each user to a setting value of the second parameter associated with the first parameter.

As another aspect of the present disclosure, an information processing apparatus is devised. The information processing apparatus includes circuitry configured to receive, in a case of changing one application, a designation of association between a first parameter before changing the one application and a second parameter after changing the one application for the device; and in response to receiving the designation of the association, set a setting value of the first parameter for each user to a setting value of the second parameter associated with the first parameter.

As another aspect of the present disclosure, a method of processing information is devised. The method includes receiving, in a case of changing one application, as designation of association between a first parameter before changing the one application and a second parameter after changing the one application for the device; and in response to receiving the designation of the association, setting a setting value of the first parameter for each user to a setting value of the second parameter associated with the first parameter.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 6 is an example of parameter before changing application of the first embodiment of this disclosure;

FIG. 8 is an example of setting value of parameter after changing application of the first embodiment of this disclosure;

FIG. 9 is an example of parameter when a setting value is not maintained of the first embodiment of this disclosure;

FIG. 13 is an example of a UI used for associating parameters of the third embodiment of this disclosure;

FIG. 21 is an example of association of setting values of parameters of the fourth embodiment of this disclosure;

FIG. 22 is an example of setting values of parameters before and after integrating applications of the fourth embodiment of this disclosure;

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

Further, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of an information processing system, an information processing apparatus, an information processing method, and a storage medium with reference to the drawings.

First Embodiment

Figure 1:
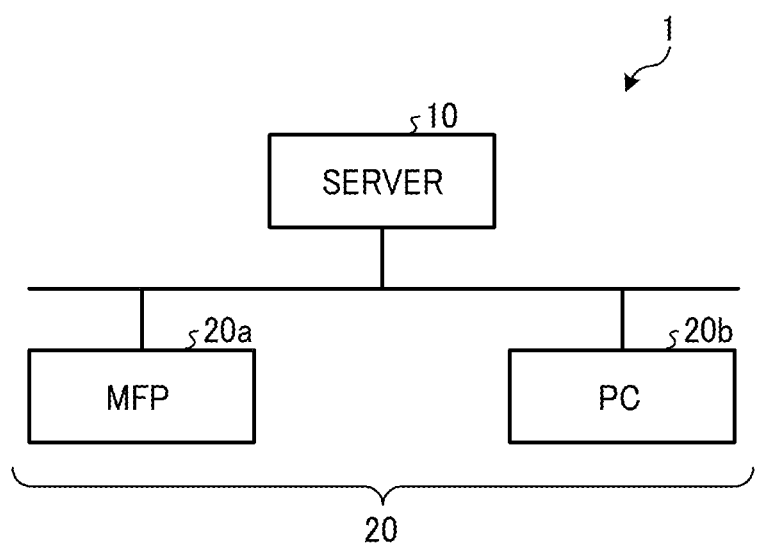
FIG. 1 is an example of configuration of an information processing system according to a first embodiment of this disclosure.

FIG. 1 is an example of configuration of an information processing system 1 according to a first embodiment of this disclosure. As illustrated in FIG. 1, the information processing system 1 includes, for example, a server 10, and a device 20 connectable to the server 10 via a communication network. The device 20 includes, for example, multifunction peripheral/product/printer (MFP) 20a and a personal computer (PC) 20b. In this description, the MFP 20a and PC 20b may be simply referred to as the device 20 without distinguishing the MFP 20a and PC 20b.

Figure 2:
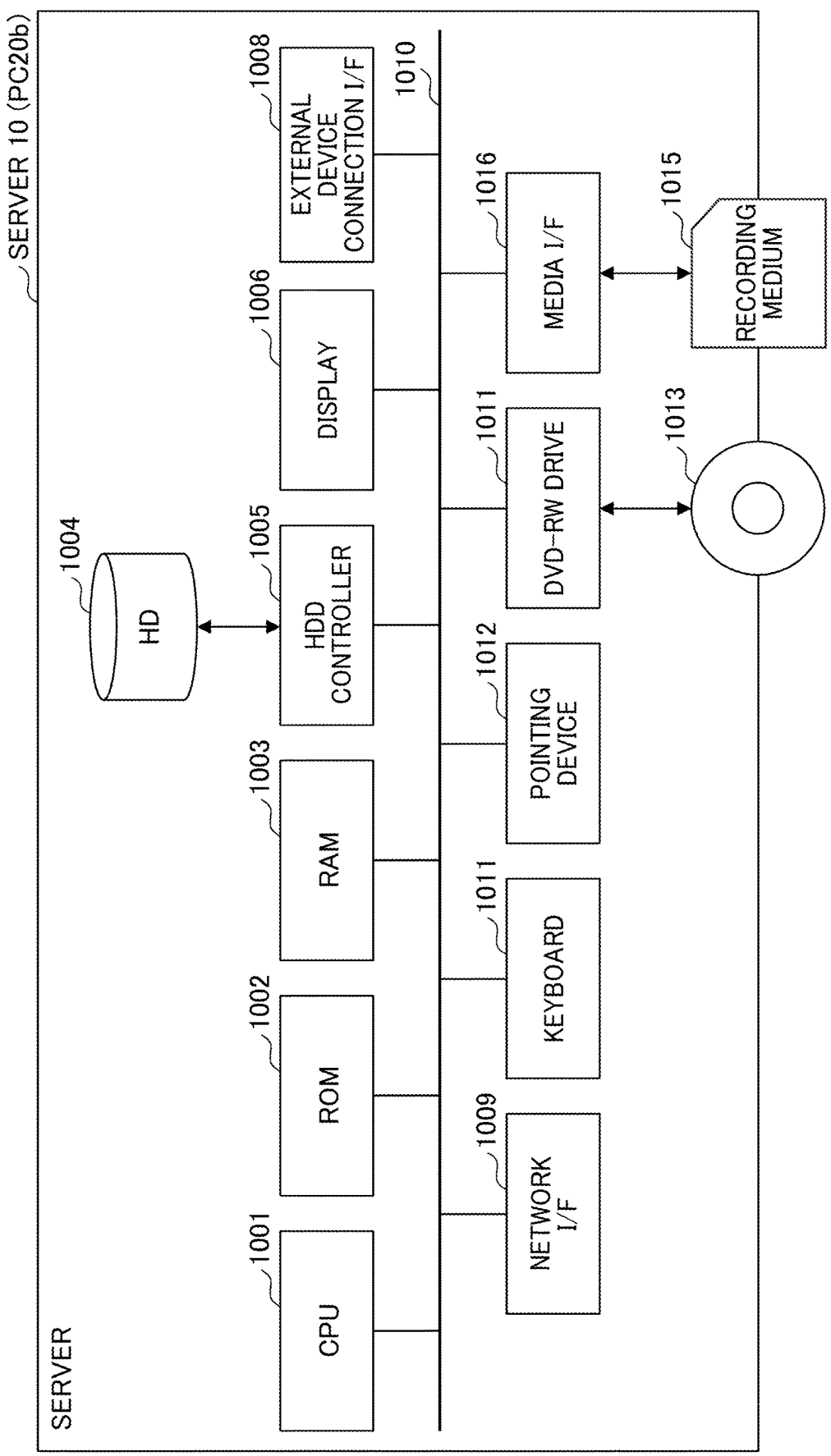
FIG. 2 is an example of configuration of hardware block diagram of a server and a PC of the first embodiment of this disclosure.

FIG. 2 is an example of configuration of hardware block diagram of the server 10 and PC 20b of the first embodiment. Hereinafter, with reference to FIG. 2, a description is given of a hardware configuration of the server 10. The PC 20b may employ a hardware configuration similar to that of the server 10.

As illustrated in FIG. 2, the server 10 is constructed by computer. As illustrated in FIG. 2, the server 10 includes, for example, a central processing unit (CPU) 1001, a read only memory (ROM) 1002, a random access memory (RAM) 1003, a hard disk (HD) 1004, a hard disk drive (HDD) controller 1005, a display 1006, and an external device connection interface (I/F) 1008. The server 10 also includes a network interface 1009, a data bus 1010, a keyboard 1011, a pointing device 1012, a digital versatile disk rewritable (DVD-RW) drive 1014, and a media interface (I/F) 1016. The CPU 1001 controls the operation of the computer 1000 entirely. The ROM 1002 stores programs used for driving the CPU 1001, such as initial program loader (IPL). The RAM 1003 is used as a work area of the CPU 1001.

The HD 1004 stores various data, such as programs. The HDD controller 1005 controls reading and writing of various data with the HD 1004 under the control of the CPU 1001.

The display 1006 displays various information such as cursor, menus, windows, characters, or images. The external device connection I/F 1008 is an interface for connecting various external devices. The external device is, for example, universal serial bus (USB) memory, printer, or the like.

The network I/F 1009 is an interface for performing data communication by utilizing the communication network. The data bus 1010 is address bus and data bus used for electrically connecting each of the components, such as the CPU 1001, illustrated in FIG. 2.

The keyboard 1011 is a type of input unit having a plurality of keys used for inputting characters, numerals, various instructions, or the like. The pointing device 1012 is a type of input unit used for selecting and executing various instructions, selecting a process target, moving a cursor, or the like. The DVD-RW drive 1014 controls reading and writing of various data with the DVD-RW 1013 used as an example of removable recording media. The computer may include digital versatile disk recordable (DVD-R) in addition to or instead of DVD-RW. The media I/F 1016 controls reading and writing (storing) of data with a recording medium 1015, such as flash memory.

Figure 3:
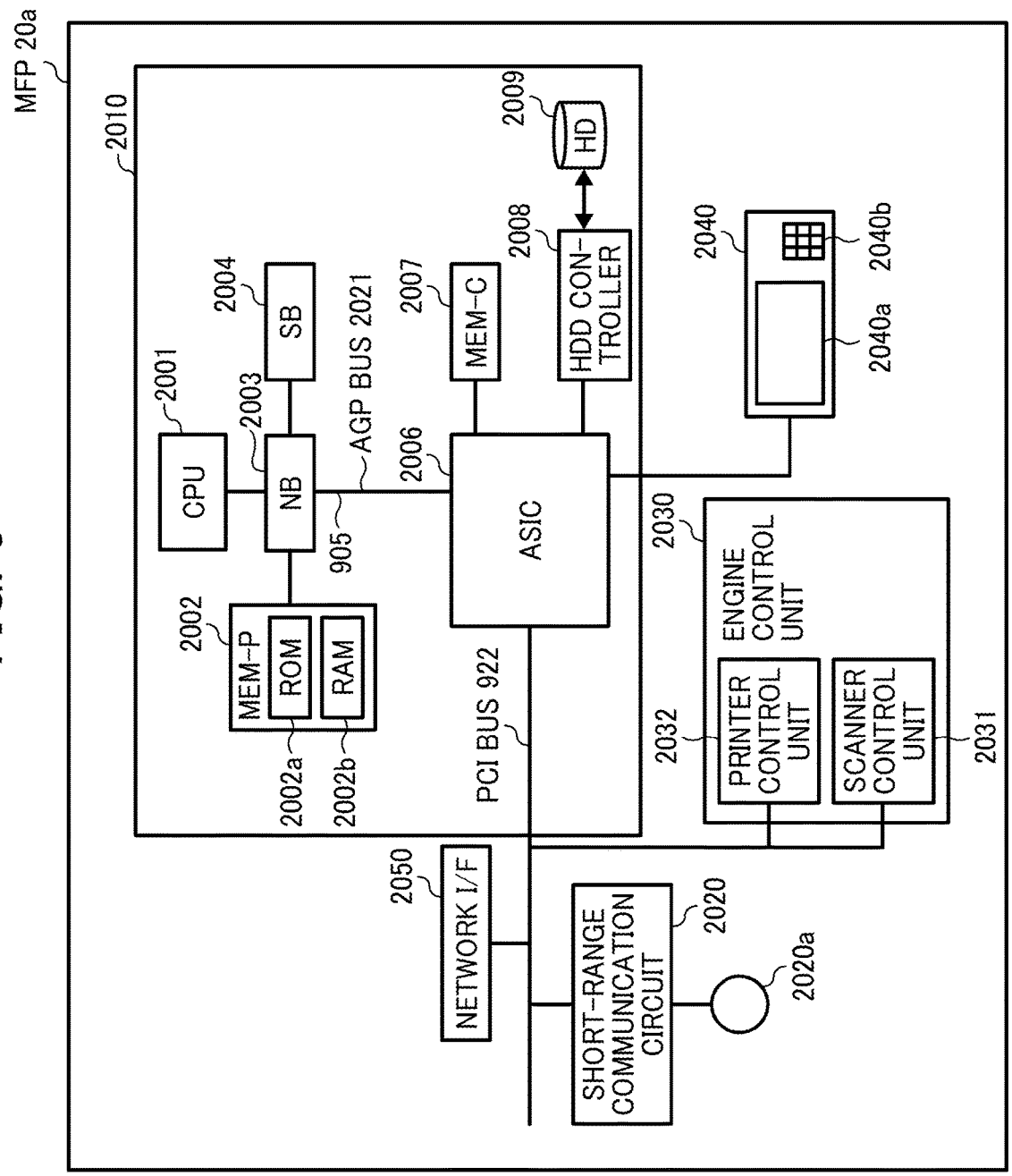
FIG. 3 is an example of configuration of hardware block diagram of MFP of the first embodiment of this disclosure.

FIG. 3 is an example of configuration of hardware block diagram of the MFP 20a of the first embodiment. As illustrated in FIG. 3, the MFP 20a includes, for example, a controller 2010, a short-range communication circuit 2020, an engine control unit 2030, an operation panel 2040, and a network I/F 2050.

As illustrated in FIG. 3, the controller 2010 includes, for example, CPU 2001, system memory (MEM-P) 2002, north bridge (NB) 2003, south bridge (SB) 2004 as main units a computer. The controller 2010 further includes application specific integrated circuit (ASIC) 2006, and local memory (MEM-C) 2007 as storage unit, HDD controller 2008, and HD 2009 as storage unit. The controller 2010 employs a configuration in which an accelerated graphics port (AGP) bus 2021 is connected between the NB 2003 and the ASIC 2006.

The CPU 2001 is a control unit that controls the MFP 20a entirely. The NB 2003 is a bridge for connecting the CPU 2001 to the MEM-P 2002, the SB 2004, and the AGP bus 2021. The NB 2003 includes, for example, a memory controller that controls reading and writing to the MEM-P 2002, and a peripheral component interconnect (PCI) master and an AGP target.

The MEM-P 2002 includes, for example, ROM 2002a and RAM 2002b. The ROM 2002a serves as a memory storing programs and data for implementing each function of the controller 2010. The RAM 2002b serves as a drawing memory for loading programs and data when performing memory printing operation. The programs stored in the RAM 2002b may be provided by recording on a recording medium, readable by a computer, such as compact disc read-only memory (CD-ROM), CD-recordable (CD-R), digital versatile disc (DVD), or the like in files using installable format or executable format.

The SB 2004 is a bridge for connecting the NB 2003, the PCI device and peripheral device. The ASIC 2006 is an integrated circuit (IC) designed for image processing application having a hardware element for image processing. The ASIC 2006 serves as a bridge to connect the AGP bus 2021, PCI bus 2022, HDD controller 2008, and MEM-C 2007 respectively.

The ASIC 2006 includes, for example, a memory controller that controls PCI target, AGP master, arbiter (ARB) that is a core of the ASIC 2006, and the MEM-C 2007. The ASIC 2006 further includes a plurality of direct memory access controllers (DMACs) that performs a rotation of image data using a hardware logic, and a PCI unit that transfers data to a scanner control unit 2031 and a printer control unit 2032 via the PCI bus 2022. Further, the ASIC 2006 can be connected to a universal serial bus (USB) interface or an interface of Institute of Electrical and Electronics Engineers 1394 (IEEE 1394).

The MEM-C 2007 is a local memory used as a copy image buffer and a code buffer. The HD 2009 is a storage for storing image data, storing font data used for printing, and storing forms. The HDD controller 2008 controls reading or writing of data to the HD 2009 under the control of the CPU 2001. The AGP bus 2021 is a bus interface used for a graphics accelerator card proposed for speeding up graphics processing. The AGP bus 2021 accesses the MEM-P 2002 directly with higher throughput to enable higher speed processing of the graphics accelerator card.

The short-range communication circuit 2020 is provided with an antenna 2020a. The short-range communication circuit 2020 is a communication circuit using, such as near field communication (NFC: registered trademark) or Bluetooth (registered trademark).

Further, the engine control unit 2030 includes, for example, the scanner control unit 2011, and the printer control unit 2032. Further, the operation panel 2040 includes, for example, a panel display unit 2040a and an input key 2040b. The panel display unit 2040a displays, for example, current setting values and a selection screen, and receives inputs from an operator. The input key 2040b includes, for example, a numeric keypad used for inputting settings as conditions of image forming, such as density setting condition, and a start key for inputting an instruction of a start of copying.

The controller 2010 controls the MFP 20a entirely. For example, the controller 2010 controls, such as drawing, communication, and input from the operation panel 2040.

The scanner control unit 2031 or the printer control unit 2032 includes, for example, an image processing unit for error diffusion and gamma conversion.

Further, by operating an application switching key on the operation panel 2040, a document box function, a copying function, a printer function, and a facsimile function can be switched and selected for the MFP 20a.

When the document box function is selected, a document box mode is set for the MFP 20a, and when the copying function is selected, a copy mode is set for the MFP 20a.

Further, when the printer function is selected, a printer mode is set for the MFP 20a, and when the facsimile mode is selected, a facsimile mode is set for the MFP 20a.

Further, the network I/F 2050 is an interface used for data communication using the communication network. The short-range communication circuit 2020 and the network I/F 2050 are electrically connected to the ASIC 2006 via the PCI bus 2022.

Figure 4:
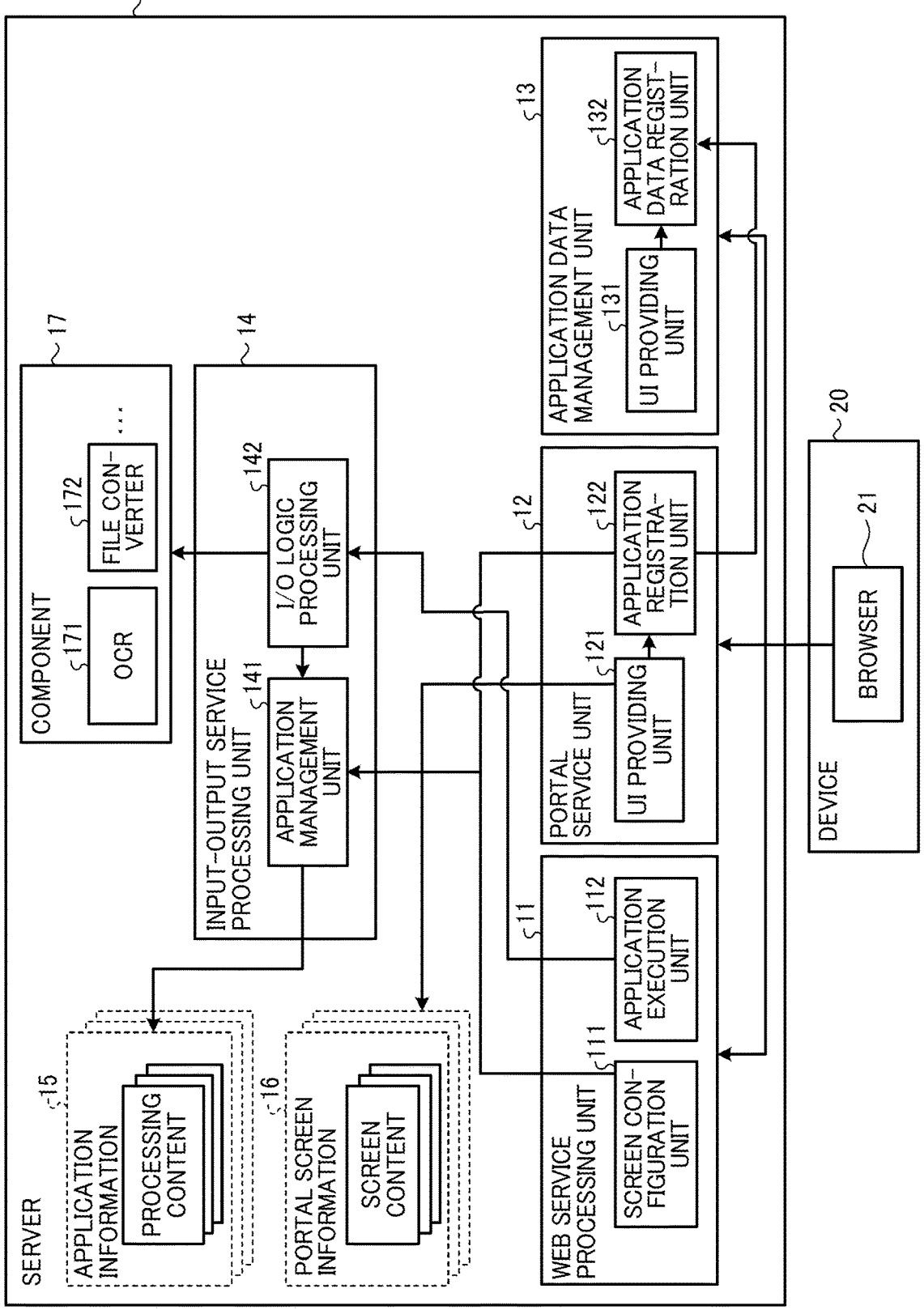
FIG. 4 is an example of configuration of functional block diagram of a server of the first embodiment of this disclosure.

FIG. 4 is an example of configuration of functional block diagram of the server 10 of the first embodiment. In this description, the server 10 is an example of information processing apparatus. As illustrated in FIG. 4, the server 10 includes, for example, web service processing unit 11, portal service unit 12, application data management unit 13, and input-output service processing unit 14.

The web service processing unit 11 is a module that configures a web application screen based on data stored in the input-output service processing unit 14, and requests an execution of given processing to the input-output service processing unit 14. In the following description, the application may be abbreviated as appl.

The web service processing unit 11 includes, for example, screen configuration unit 111, and application execution unit 112. The screen configuration unit 111 configures a web application screen based on information acquired from the input-output service processing unit 14. The application execution unit 112 performs given processing based on a request received from a user.

The portal service unit 12 provides an user interface (UI) for developing an application by displaying the UI via the browser 21 of the device 20 to a user, and performs new registration and change of application in accordance with an user operation. In this description, the application is an application that combines, for example, various processing (components) to perform one flow.

The portal service unit 12 includes, for example, user interface (UI) providing unit 121, and application registration unit 122.

The UI providing unit 121 provides a given UI to a user via the browser of the device 20 based on a screen content of portal screen information 16.

The application registration unit 122 receives a request from a user, and registers an application generated via a UI in the input-output service processing unit 14. The application registered in the input-output service processing unit 14 can be a web application to be executed on the web.

The application data management unit 13 manages data on application. The data on application includes parameters, and setting values for each of parameters. The application data management unit 13 includes, for example, UI providing unit 131, and application data registration unit 132. The method of managing parameters and setting values will be described later.

The input-output service processing unit 14 includes, for example, application management unit 141, and input/output (I/O) logic processing unit 142. The application management unit 141 stores and manages processing content of the developed application as application information 15.

The input-output logic processing unit 142 receives an execution request of application and then performs a flow. For example, the input-output logic processing unit 142 performs the flow by combining an optical character reading (OCR) 171 and a file converter 172 of component 17.

Figure 5:
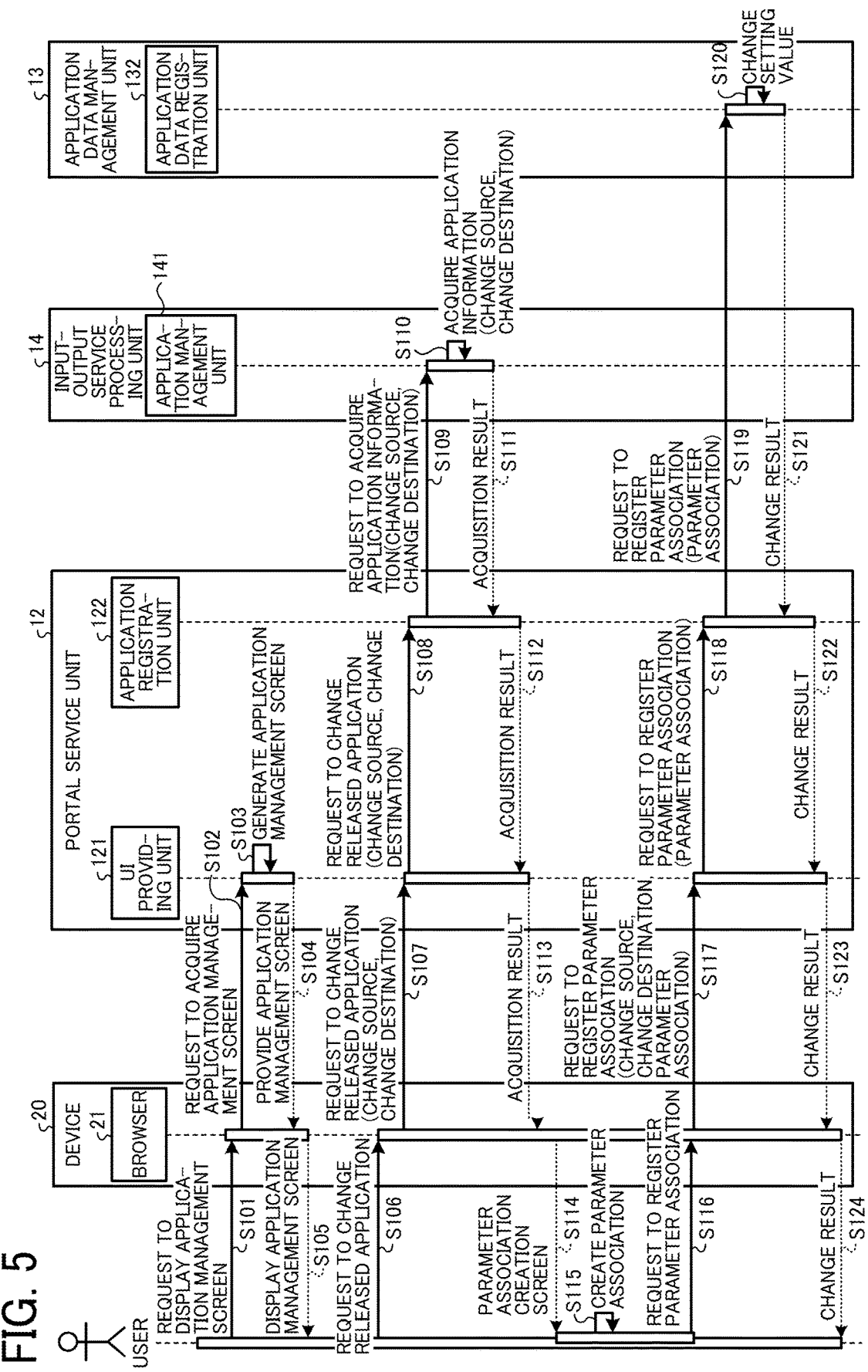
FIG. 5 is an example of a sequence diagram of changing setting value of parameter of the first embodiment of this disclosure.

FIG. 5 is an example of a sequence diagram of changing setting value of parameter of the first embodiment.

As illustrated in FIG. 5, a user requests the browser 21 of the device 20 to display an application management screen, and then the device 20 receives the display request of application management screen (step S101).

Then, the browser 21 of the device 20 requests the UI providing unit 121 of the portal service unit 12 to acquire the application management screen (step S102).

Then, the UI providing unit 121 generates the application management screen (step S103).

Then, the UI providing unit 121 provides the generated application management screen to the browser 21 (step S104).

Then, the device 20 displays the application management screen using the browser 21 (step S105).

Then, the user requests the browser 21 to change a released application, and then the device 20 receives the change request of released application (step S106). In step S106, the user inputs or enters information on an application of change source (before performing a changing operation of application) and information on an application of change destination (after performing a changing operation of application), and then the device 20 receives the information on the application of change source and the information on the application of change destination.

Then, the browser 21 of the device 20 requests the UI providing unit 121 to change the released application (step S107).

Then, the UI providing unit 121 requests the application registration unit 122 to change the released application (step S108).

Then, the application registration unit 122 requests the application management unit 141 of the input-output service processing unit 14 to acquire application information (step S109).

Then, the application management unit 141 acquires the application information (step S110), and returns an acquisition result to the application registration unit 122 (step S111).

Then, the application registration unit 122 returns the acquisition result to the UI providing unit 121 (step S112).

Then, the UI providing unit 121 returns the acquisition result to the browser 21 of the device 20 (step S113).

Then, the browser 21 of the device 20 displays a screen used for creating association of parameters (hereinafter, parameter association creation screen) (step S114).

Then, the user creates an association between parameters before performing a changing operation of application and parameters after performing a changing operation of application using the parameter association creation screen, in which the browser 21 of the device 20 receives the association of parameters (step S115), and then the device 20 receives a registration request of the parameter association (step S116).

Then, the browser 21 requests the 111 providing unit 121 to register the parameter association (step S117).

Then, the UI providing unit 121 requests the application registration unit 122 to register the parameter association (step S118).

Then, the application registration unit 122 requests the application data registration unit 132 of the application data management unit 13 to register the parameter association (step S119).

Then, in response to receiving the registration request of parameter association, the application data registration unit 132 changes the setting value of parameter for each user who uses the application in accordance with the parameter association registered in step S116 (step S120).

Then, the application data registration unit 132 returns a change result to the application registration unit 122 (step S121).

Then, the application registration unit 122 returns the change result to the UI providing unit 121 (step S122).

Then, the UI providing unit 121 returns the change result to the browser 21 (step S123).

Then, the browser 21 displays the change result (step S124).

In this description, it is assumed that a user sets parameters before performing a changing operation of application and parameters after performing a changing operation of application as follows.

Before Change

FlowControl.CustomParameters2.TextParameters (type: string, default: " ")
FlowControl.CustomParameters3.NumberParameters (type: number, default: 0)
OCR.ExecuteOCR.OutputFileFormat (type; string, default: "PDF")
GoDrive.UploadFile.FolderId (type: string, default: "Root")

After Change

FlowControl.CustomParameters2.BooleanParameters (type: boolean, default: true)
FlowControl.CustomParameters3.TextParameters (type: string, default: " ")
OCR.ExecuteOCR.OutputFileFormat (type: string, default: "PDF")
GoDrive.V2.UploadFile.FolderId (type; string, default: "Root")

Figure 7:
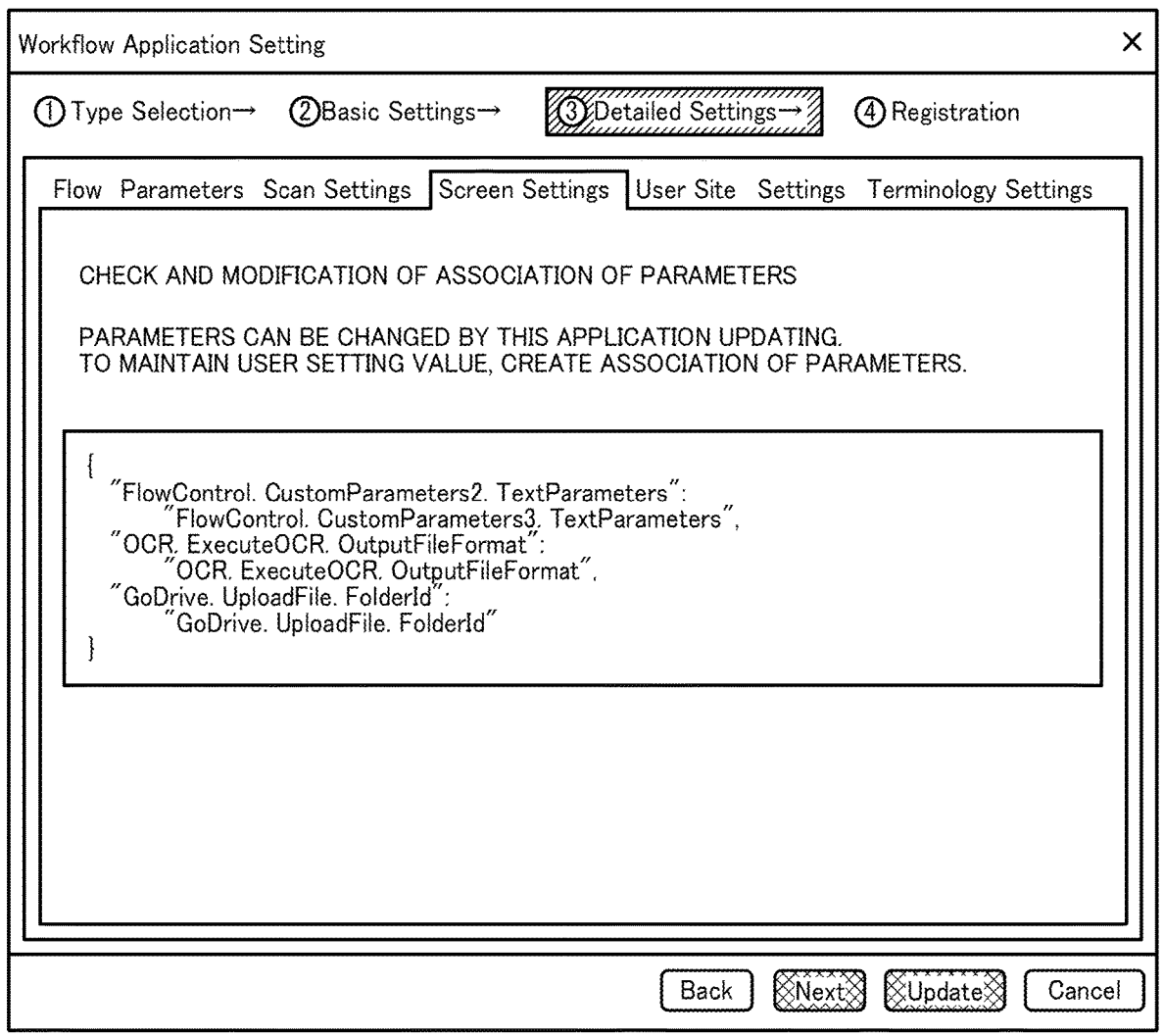
FIG. 7 is an example of parameter association creation screen of the first embodiment of this disclosure.

FIG. 6 is an example of parameter before performing a changing operation of application. It is assumed that the setting value of the parameter before performing a changing operation of application is set as illustrated in FIG. 6. In this example case, a user checks the setting of the parameter association via the parameter association creation screen displayed using the browser 21 as illustrated in FIG. 7. FIG. 7 is an example of parameter association creation screen.

Then, the portal service unit 12 changes the parameter set for each user who uses the application in accordance with the parameter association.

FIG. 8 is an example of setting value of parameter after performing a changing operation of application. The setting value of parameter after performing a changing operation of application become as illustrated in FIG. 8.

In this description, as illustrated in FIG. 7, the association of parameters before and after performing a changing operation of application can be expressed using a given format, such as JavaScript Object Notation (JSON) format. The key in the JSON format data is an identifier of the parameter before performing a changing operation of application, and a value corresponding to the key is an identifier of the parameter after performing a changing operation of application.

In an example case of FIG. 7, the association of parameter is not created for the parameter of "FlowControl.CustomParameters3.NumberParameters" (before change), and the parameter of "FlowControl.CustomParameters2.BooleanParameters" (after change).

In the information processing system 1 according to the first embodiment, as to a parameter that a user determines there is no need to maintain a setting value, the association of parameter may not be created.

FIG. 9 is an example of parameter when the setting value is not maintained. If the setting value of parameter is not maintained before and after performing a changing operation of application in the first embodiment, the setting value of parameter after performing a changing operation of application becomes as illustrated in FIG. 9. That is, the portal service unit 12 discards the setting value of parameters other than the parameter of "OCR.ExecuteOCR.OutputFileFormat" having the key completely matched before and after performing a changing operation of application. If the setting value is discarded, the setting value is not described as illustrated in FIG. 9, and the portal service unit 12 replaces the discarded setting value with a given initial value at the time of application execution.

In the information processing system 1 according to the first embodiment, as above described, when the application is changed, the portal service unit 12 receives, from the device 20, a designation of association of the parameter before performing a changing operation of application and the parameter after performing a changing operation of application.

Then, in accordance with the association received by the portal service unit 12, the application data management unit 13 sets a setting value for each user that was set for a first parameter before performing a changing operation of application to a setting value of a second parameter, which is a parameter after performing a changing operation of application and is associated with the first parameter.

In the first embodiment, the portal service unit 12 functions as association reception unit. Further, the application data management unit 13 functions as setting unit.

Therefore, as to the information processing system 1 according to the first embodiment, when a name of parameter of created application and selectable parameters are to be changed, a screen that is used for receiving an association relationship between the parameter before performing a changing operation of application and the parameter after performing a changing operation of application can be provided to an application developer. Therefore, the information processing system 1 of the first embodiment can support or assist the development of application capable of appropriately inheriting the setting value of each user.

Second Embodiment

Hereinafter, with reference to FIGS. 10 and 11, a description is given of a second embodiment. In the following description, the basic configuration and function of each embodiment May be common to the first embodiment, unless otherwise described. The description of each embodiment of this disclosure will be described with reference to differences with respect to the first embodiment.

In the second embodiment, the application registration unit 122 automatically performs the parameter association. Further, the device 20 uses the browser 21 to display a UI for checking the automatic parameter association and modifying the automatic parameter association manually to provide the UI to a user.

The application registration unit 122 can associate parameters having similar names before and after performing a changing operation of application based on the Levenshtein distance or the like. For example, a case of searching a parameter similar to a parameter of "GoDrive.UploadFile.FolderId (type: string, default: "Root") before performing a changing operation of application is considered.

In this case, since the parameter of "OCR.ExecuteOCR.OutputFileFormat (type: string, default: "PDF") after performing a changing operation of application has almost no part that matches the parameter used as the search source or search target, this parameter is considered to have the Levenshtein distance that is increased. Therefore, the parameter after performing, a changing operation of application cannot be regarded as similar to the searched parameter.

On the other hand, since the parameter of "GoDriveV2.UploadFile.FolderId (type: string, default: "Root") after performing a changing operation of application is prepared by just adding a character string of "V2" to the parameter used as the search source or search target, this parameter is considered to have the Levenshtein distance that is decreased, and thereby the parameter after performing a changing operation of application can be regarded as similar to the parameter used as the search source or search target.

For example, the application registration unit 122 associates the parameter before performing a changing operation of application and the parameter P after performing a changing operation of application using the following logic.

(1) The application registration unit 122 sets a list of parameters existing in the pre-change application as candidates for the association.

(2) The application registration unit 122 excludes the parameter that are already associated with the parameter existing in the application after changing (other than P) from the candidates.

(3) If a parameter having a type that matches a type of the parameter P exists in the candidates, the application registration unit 122 excludes the parameter having a type not matching the type of the parameter P from the candidates.

(4) Among the candidates, the application registration unit 122 associates a parameter having the smallest Levenshtein distance for the parameter name with respect to the parameter P, with the parameter P.

Figure 11:
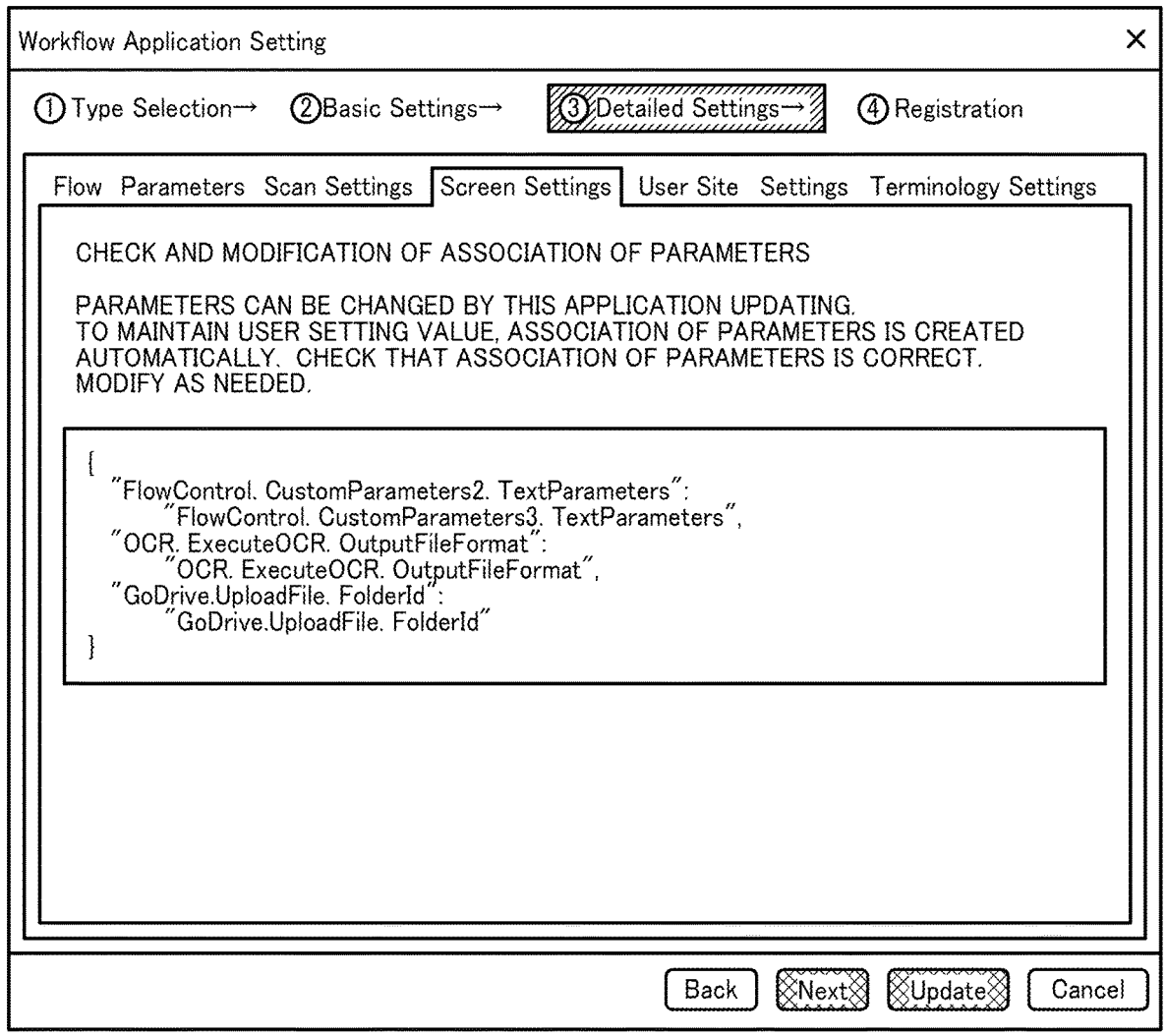
FIG. 11 is an example of parameter association creation screen of the second embodiment of this disclosure.

After performing, the association using the application registration unit 122, the UI providing unit 121 causes the browser 21 of the device 20 to display a screen illustrated in FIG. 11, which displays a message indicating that the association has been automatically performed. FIG. 11 is an example of parameter association creation screen.

Figure 10:
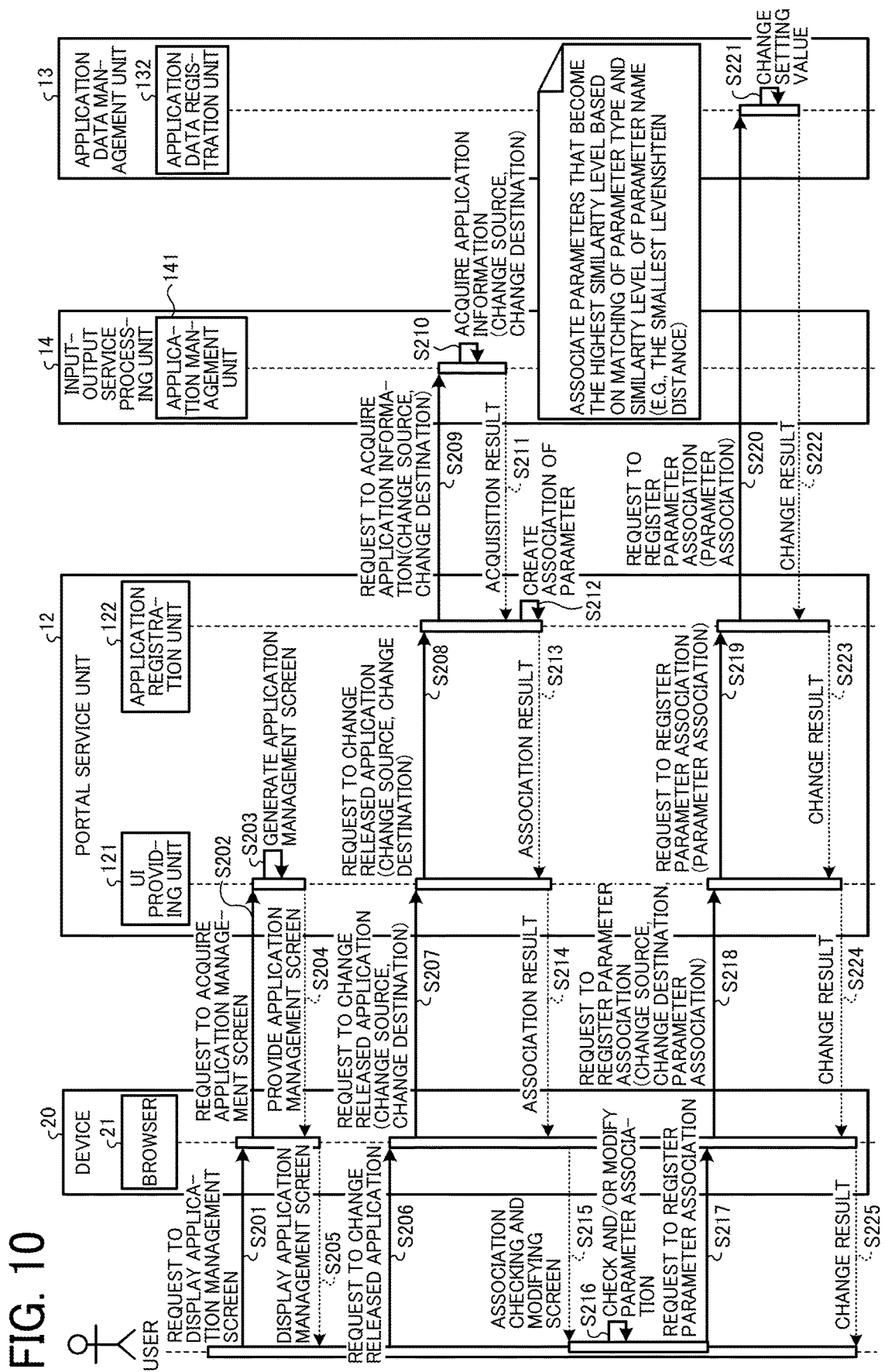
FIG. 10 is an example of a sequence diagram of changing setting value of parameter of a second embodiment of this disclosure.

FIG. 10 is an example of a sequence diagram of changing the setting value of parameter of the second embodiment.

As illustrated in FIG. 10, a user requests the browser 21 of the device 20 to display an application management screen, and then the device 20 receives the display request of an application management screen (step S201).

Then, the browser 21 of the device 20 requests the UI providing unit 121 of the portal service unit 12 to acquire the application management screen (step S202).

Then, the UI providing unit 121 generates the application management screen (step S203).

Then, the UI providing unit 121 provides the generated application management screen to the browser 21 (step S204).

Then, the device 20 displays the application management screen (step S205).

Then, the user requests the browser 21 to change a released application, then the device 20 receives the change request of released application (step S206). In step S206, the user inputs or enters information on an application of change source (before performing a changing operation of application) and information on an application of change destination (after performing a changing operation of application).

Then, the browser 21 of the device 20 requests the providing unit 121 to change the released application (step S207).

Then, the UI providing unit 121 requests the application registration unit 122 to change the released application (step S208).

Then, the application registration unit 122 requests the application management unit 141 of the input-output service processing unit 14 to acquire application information (step S209).

Then, the application management unit 141 acquires the application information (step S210), and returns an acquisition result to the application registration unit 122 (step S211).

Then, the application registration unit 122 creates an association of parameters based on the acquisition result (step S212). For example, the application registration unit 122 performs the association in accordance with the logic described above.

Then, the application registration unit 122 returns an association result to the UI providing unit 121 (step S213).

Then, the UI providing unit 21 returns the association result to the browser 21 (step S214).

Then, the browser 21 of the device 20 displays a screen used for checking and modifying the association result of associated parameters (hereinafter, association checking and modifying screen) (step S215).

Then, the user checks and modifies the association between the parameter before performing a changing operation of application and the parameter after performing a changing operation of application, as needed (step S216), and then requests the browser 21 to register the parameter association, and then the device 20 receives a registration request of the parameter association (step S217).

Then, the browser 21 requests the UI providing unit 121 to register the parameter association (step S218).

Then, the UI providing unit 121 requests the application registration unit 122 to register the parameter association (step S219).

Further, in response to receiving the registration request of the parameter association, the application registration unit 122 requests the application data registration unit 132 of the application data management unit 13 to register the parameter association by changing the setting value of the parameter (step S220).

Then, in response to receiving the change request of setting value of the parameter, the application data registration unit 132 changes the setting value of the parameter in accordance with the parameter association registered in step S217 (step S221).

Then, the application data registration unit 132 returns a change result to the application registration unit 122 (step S222).

Then, the application registration unit 122 returns the change result to the UI providing unit 121 (step S223).

Then, the UI providing unit 121 returns the change result to the browser 21 (step S224).

Then, the browser 21 displays the change result (step S225).

As above described, as to the parameter after performing a changing operation of application having a type matching a type of the first parameter, the application data management unit 13 sets the setting value of the first parameter to the setting value of the second parameter having the smallest Levenshtein distance for the parameter name with respect to the first parameter.

Third Embodiment

In a third embodiment, the UI providing unit 121 provides a UI to associate the parameters before and after performing a changing operation of application in response to an operation performed by a user intuitively. FIGS. 12 to 17 are examples of UI used for associating parameters.

Figure 12:
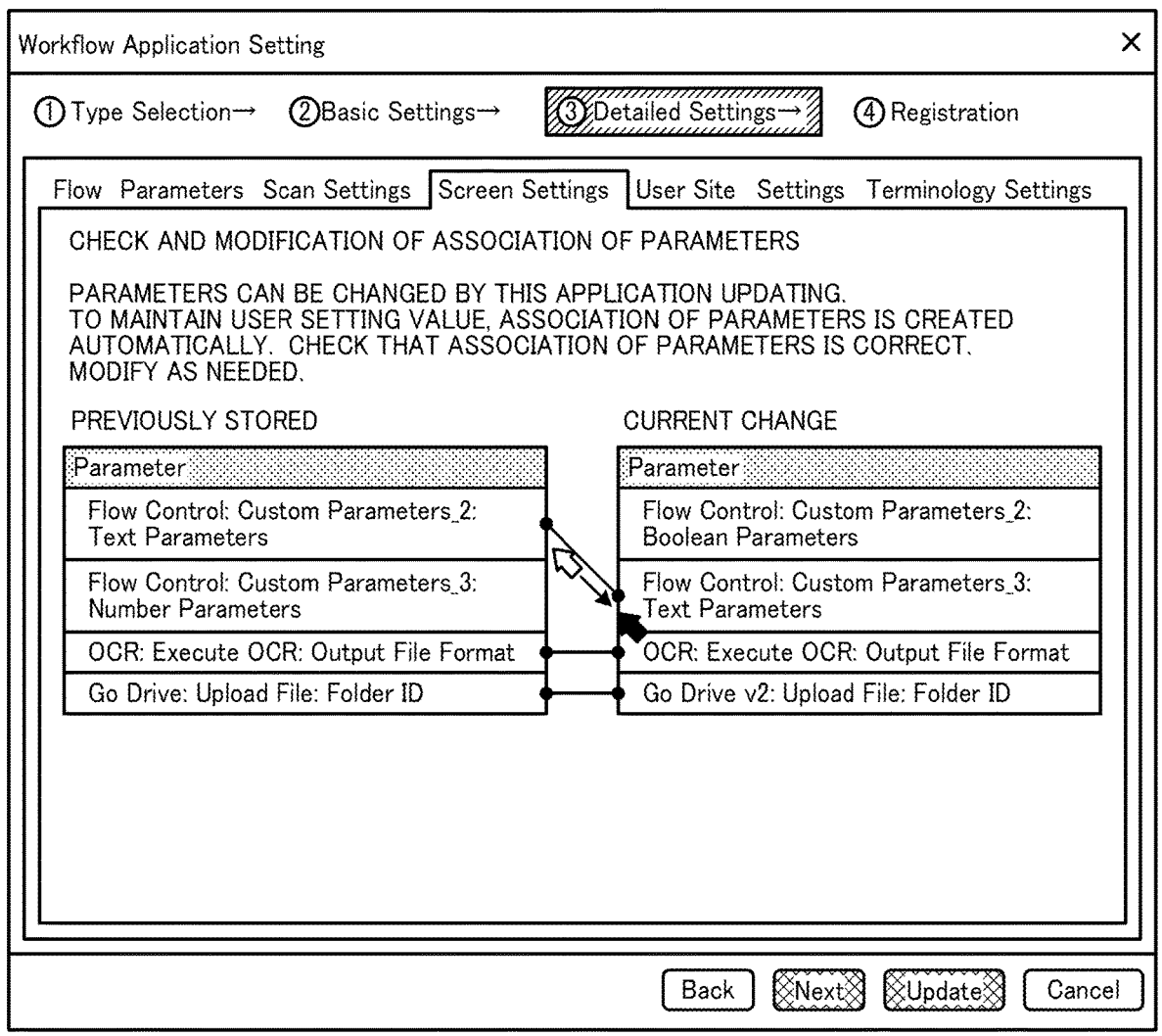
FIG. 12 is an example of a UI used for associating parameters of a third embodiment of this disclosure.
Figure 14:
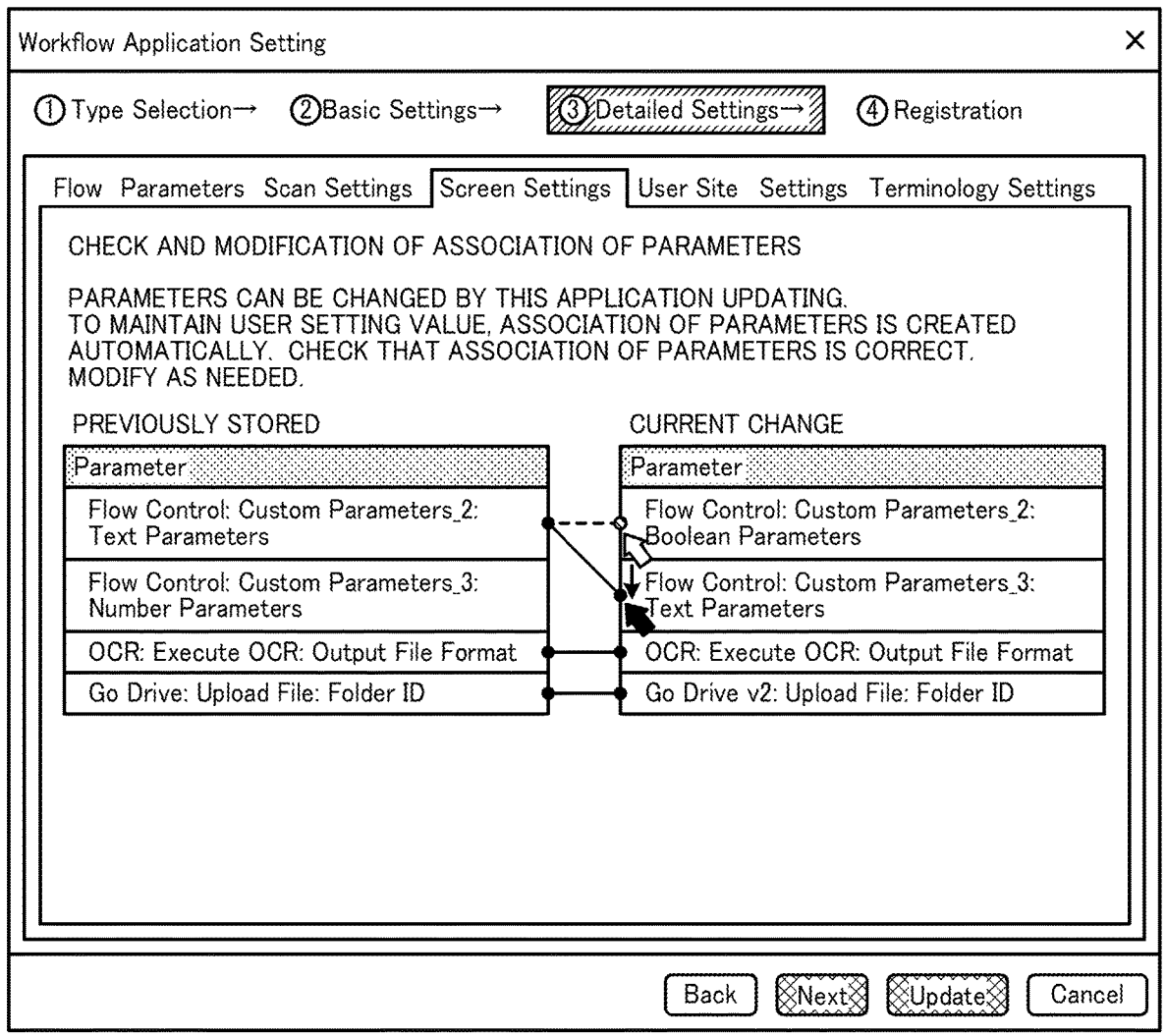
FIG. 14 is an example of a UI used for associating parameters of the third embodiment of this disclosure.

At first, after the parameters are automatically associated using the method of the second embodiment, the UI providing unit 121 provides a UI illustrated in FIG. 12. In the third embodiment, as illustrated in FIGS. 13 and 14, when a user performs an operation of drag and drop of the end (vertex) of one or more lines connecting objects corresponding to the respective parameters, the association between the parameters can be changed. In an example case of FIG. 13, a cell of table corresponds to the object.

Figure 15:
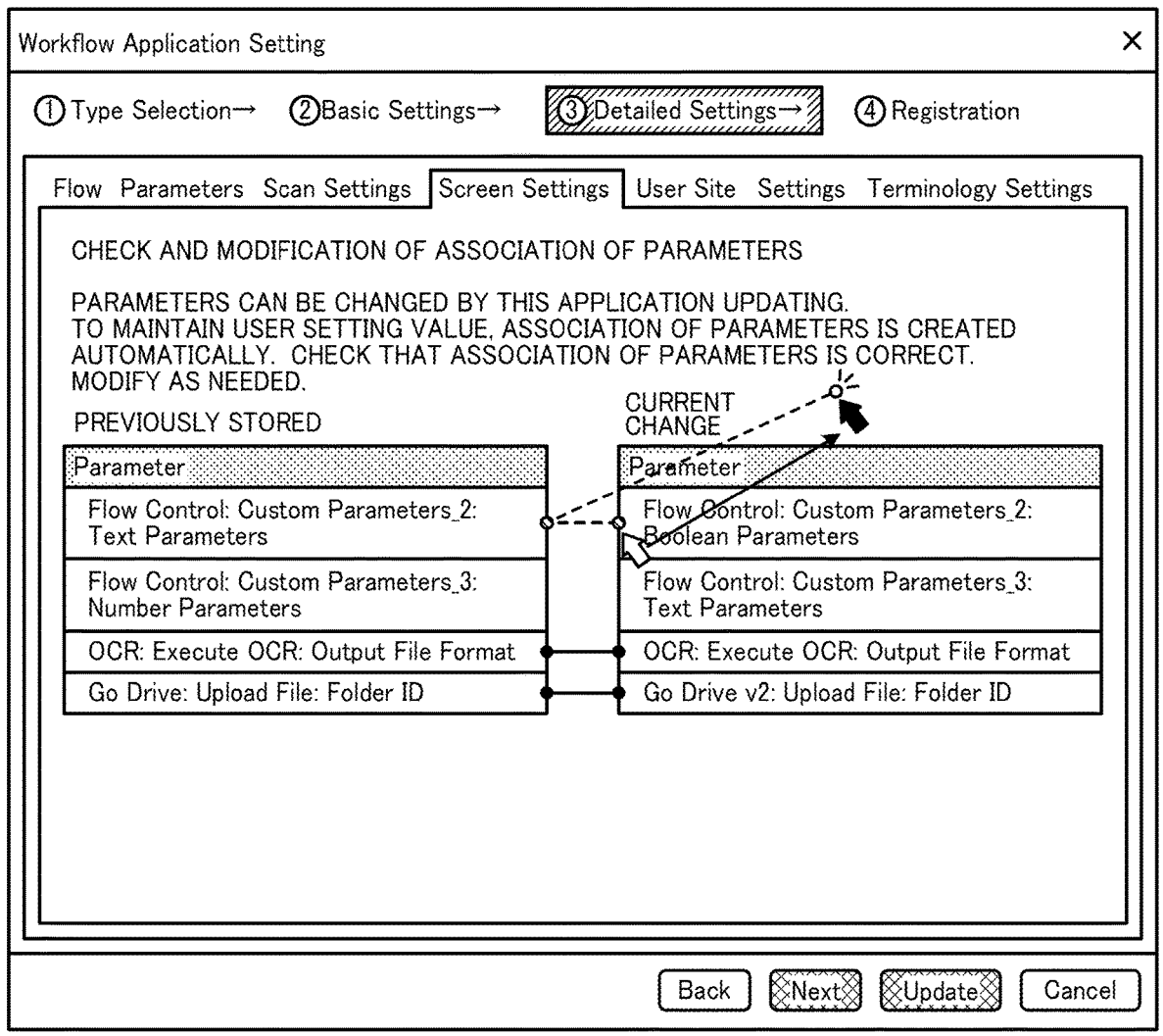
FIG. 15 is an example of a UI used for associating parameters of the third embodiment of this disclosure.

Further, as illustrated in FIG. 15, when the user drags and drops an end of a line connecting the objects to an area where no object corresponding to a parameter exists, the association relationship indicated by the line can be deleted.

As above described, the UI providing unit 121 provides a UI capable of associating the first parameter and the second parameter by manually moving the object corresponding to each parameter on the screen.

The UI providing unit 121 can provide a UI that displays the objects corresponding to the respective parameters and the one or more lines connecting the objects using a style reflecting plausibility of the association between the objects.

Figure 16:
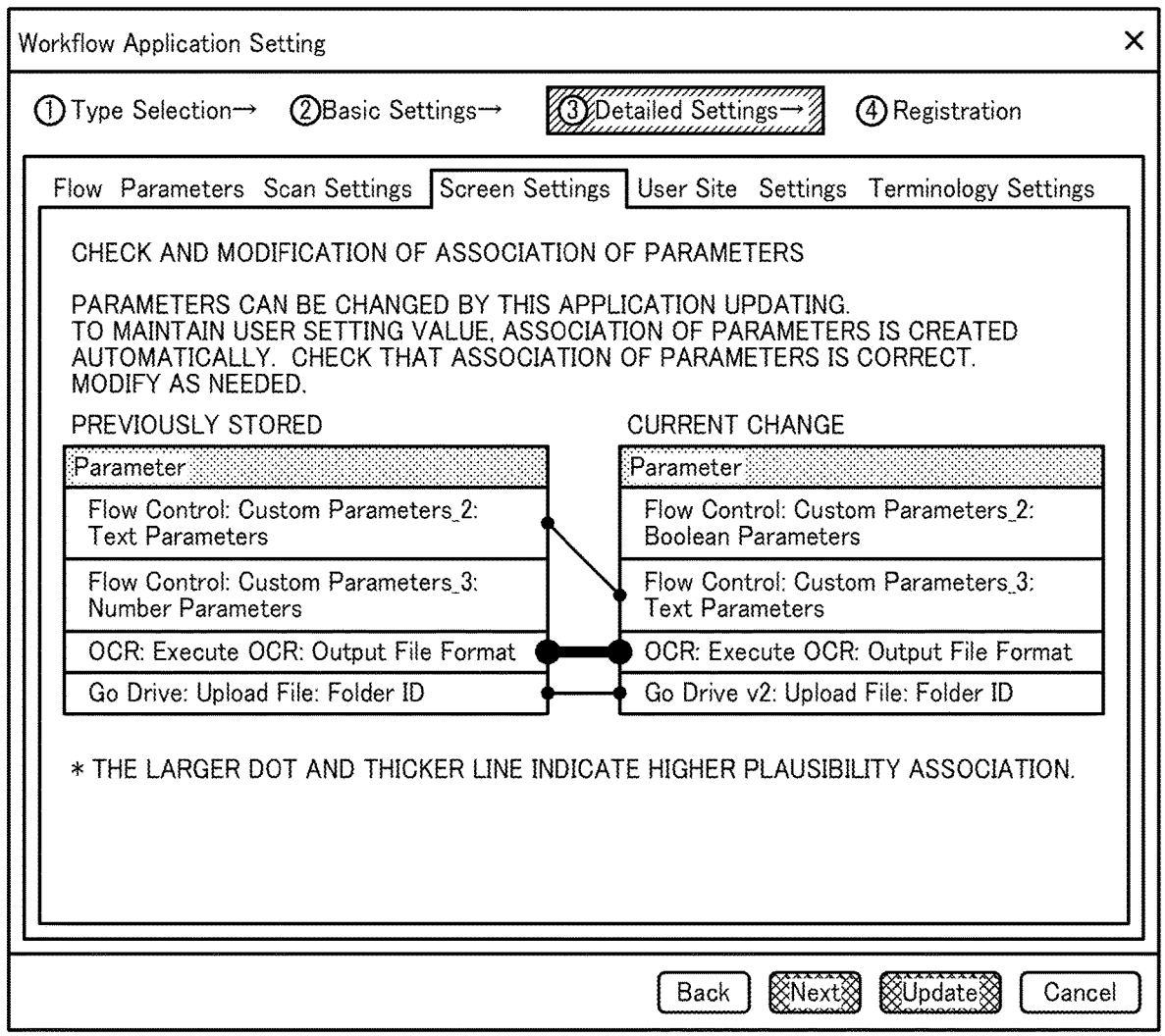
FIG. 16 is an example of a UI used for associating parameters of the third embodiment of this disclosure.

As illustrated in FIG. 16, the UI providing unit 121 can change a thickness of the lines and a size of the end of the lines depending on the similarity level between the parameters. For example, the UI providing unit 121 can increase the thickness of the lines and increase the size of the end of the lines as the Levenshtein distance between the parameter names becomes smaller.

The smaller the Levenshtein distance is, the greater the plausibility.

Therefore, when the Levenshtein distance is set as D, the plausibility can be expressed as 1/D or −D.

Further, when a cursor is placed on the object corresponding to each parameter, the UI providing unit 121 provides a UI that displays information about the object on which the cursor is placed.

Figure 17:
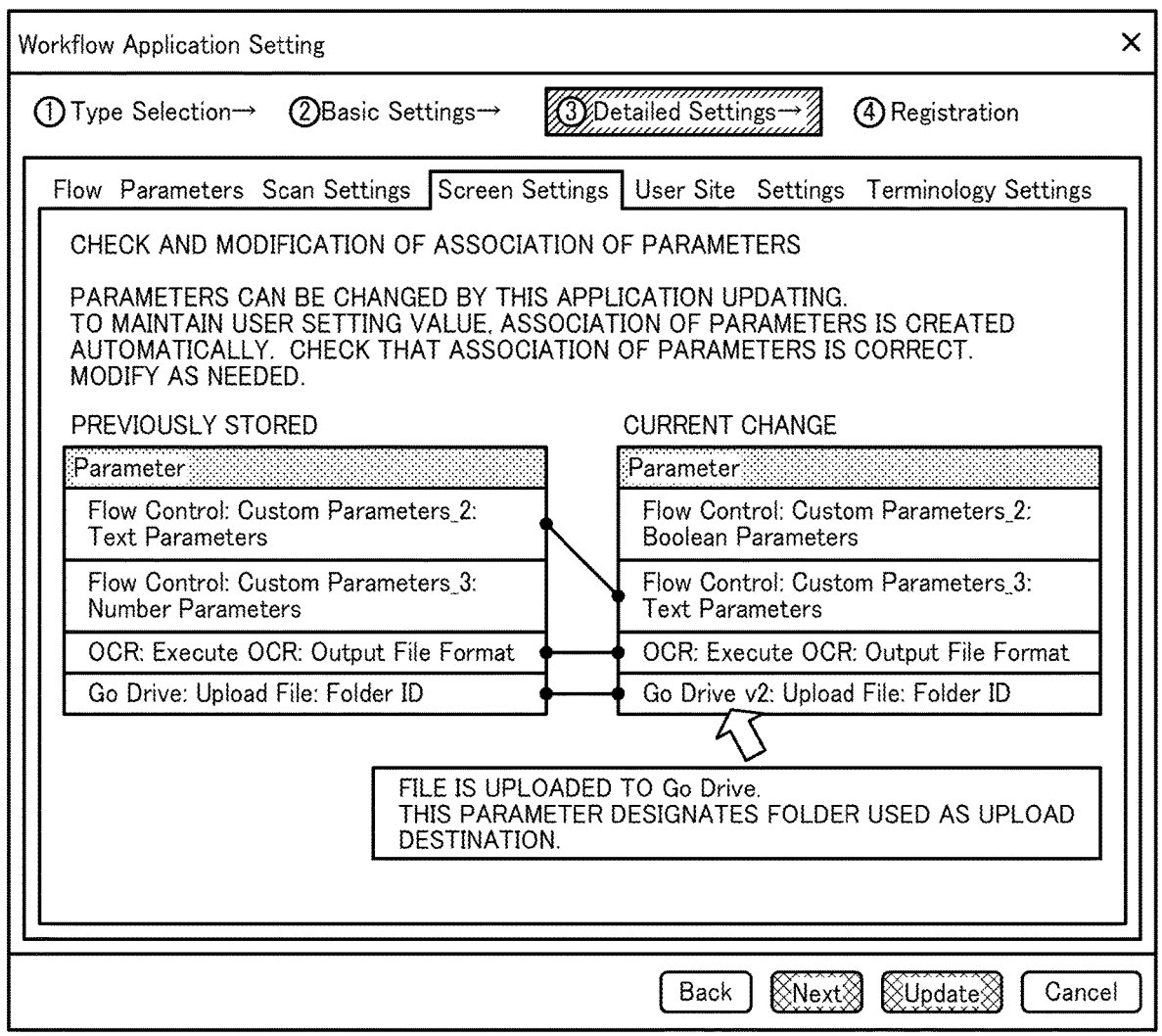
FIG. 17 is an example of a UI used for associating parameters of the third embodiment of this disclosure.

In an example case of FIG. 17, a description of "GoDriveV2.UploadFile.FolderId (type: string, default: "Root")" is displayed by placing the cursor on the object.

Further, the UI providing unit 121 may display the setting value of the parameter before performing a changing operation of application and the candidate of the setting value of the parameter after performing a changing operation of application.

Fourth Embodiment

Hereinafter, with reference to FIGS. 18 to 23, a description is given of a fourth embodiment, which is an example case of integrating a plurality of applications into one application. For example, as to the fourth embodiment, a plurality of applications having the same function but differing only in storage services, such as "Scan to Go Drive" and "Scan to Box", can be changed to one new application, such as "Scan to Storage" having the storage selecting function.

Figure 18:
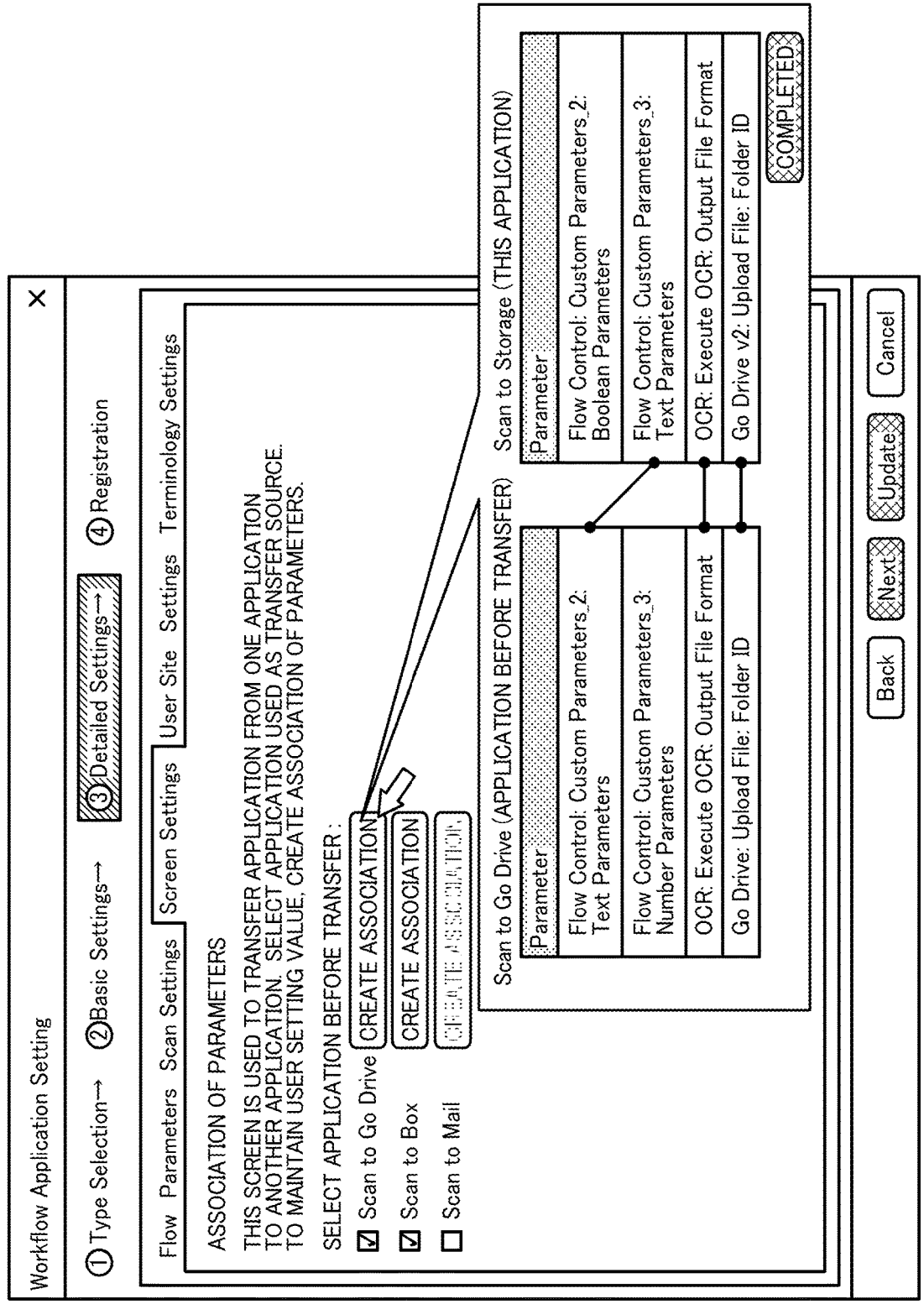
FIG. 18 is an example of screen used for integrating applications of a fourth embodiment of this disclosure.

FIG. 18 is an example of screen used for integrating applications. As illustrated in FIG. 18, the screen used for integrating applications (hereinafter, application integration screen) displays one or more check boxes used for designating a plurality of applications of change source (application of transfer source), and a pop-up that allows a user to create the parameter association for each of the applications checked in the check box.

In an example case of FIG. 18, a user of the device 20 is to replace "Scan to Go Drive" application and "Scan to Box" application being used by the user with "Scan to Storage" application that is being created. Further, to maintain the user setting value during this replacement, the device 20 performs the setting of how to associate which parameter of "Scan to Go Drive" application to which parameter of "Scan to Storage" application, as indicated in FIG. 18. Further, in this case example case, the device 20 does not replace "Scan to Mail" application with "Scan to Storage" application.

Figure 19:
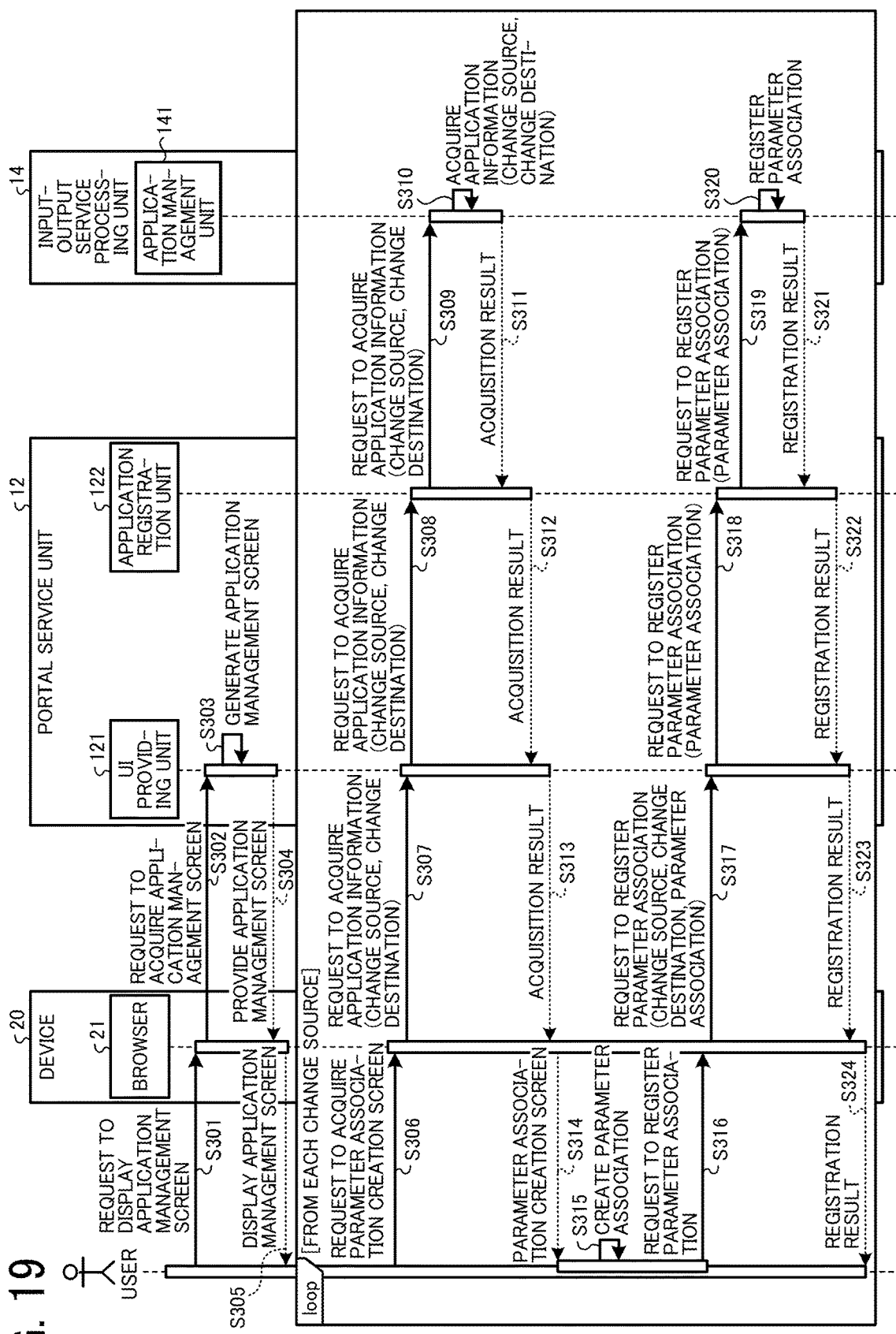
FIG. 19 is an example a sequence diagram of integrating applications of the fourth embodiment of this disclosure.

FIG. 19 is an example a sequence diagram of integrating applications of the fourth embodiment.

As illustrated in FIG. 19, a user requests the browser 21 of the device 20 to display an application management screen, and then the device 20 receives the display request of an application management screen (step S301).

Then, the browser 21 of the device 20 requests the UI providing unit 121 of the portal service unit 12 to acquire the application management screen (step S302).

Then, the UI providing unit 121 generates the application management screen (step S303).

Then, the UI providing unit 121 provides the generated application management screen to the browser 21 (step S304).

Then, the device 20 displays the application management screen (step S305).

As to this sequence, the information processing system 1 repeats the following steps S306 to S324 for the number of the applications used as the change source.

Then, the user requests the browser 21 to acquire the parameter association creation screen, in which the device 20 receives the display request of parameter association creation screen (step S306).

Then, the browser 21 requests the UI providing unit 121 to acquire application information (step S307).

Then, the UI providing unit 121 requests the application registration unit 122 to acquire the application information (step S308).

Then, the application registration unit 122 requests the application management unit 141 to acquire the application information (step S309).

Then, the application management unit 141 acquires or obtains the application information (step S310), and returns an acquisition result to the application registration unit 122 (step S311).

Then, the application registration unit 122 returns the acquisition result to the UI providing unit 121 (step S312).

Then, the UI providing unit 121 returns the acquisition result to the browser 21 (step S313).

Then, the browser 21 displays the parameter association creation screen (step S314).

Then, the user creates an association of the parameter before performing a changing operation of application and the parameter after performing a changing operation of application, in which the device 20 receives the association of the parameters (step S315).

Then, the user requests the browser 21 of the device 20 to register the parameter association (step S316), and the browser 21 requests the UI providing unit 121 to register the parameter association (step S317).

Then, the UI providing unit 121 requests the application registration unit 122 to register the parameter association (step S318).

Then, the application registration unit 122 requests the application management unit 141 to register the parameter association (step S319).

Then, the application management unit 141 registers the parameter association (step S320).

Then, the application management unit 141 returns a registration result to the application registration unit 122 (step S321).

Then, the application registration unit 122 returns the registration result to the UI providing unit 121 (step S322).

Then, the UI providing unit 121 returns the registration result to the browser 21 (step S323).

Then, the browser 21 displays the registration result (step S324).

Figure 20:
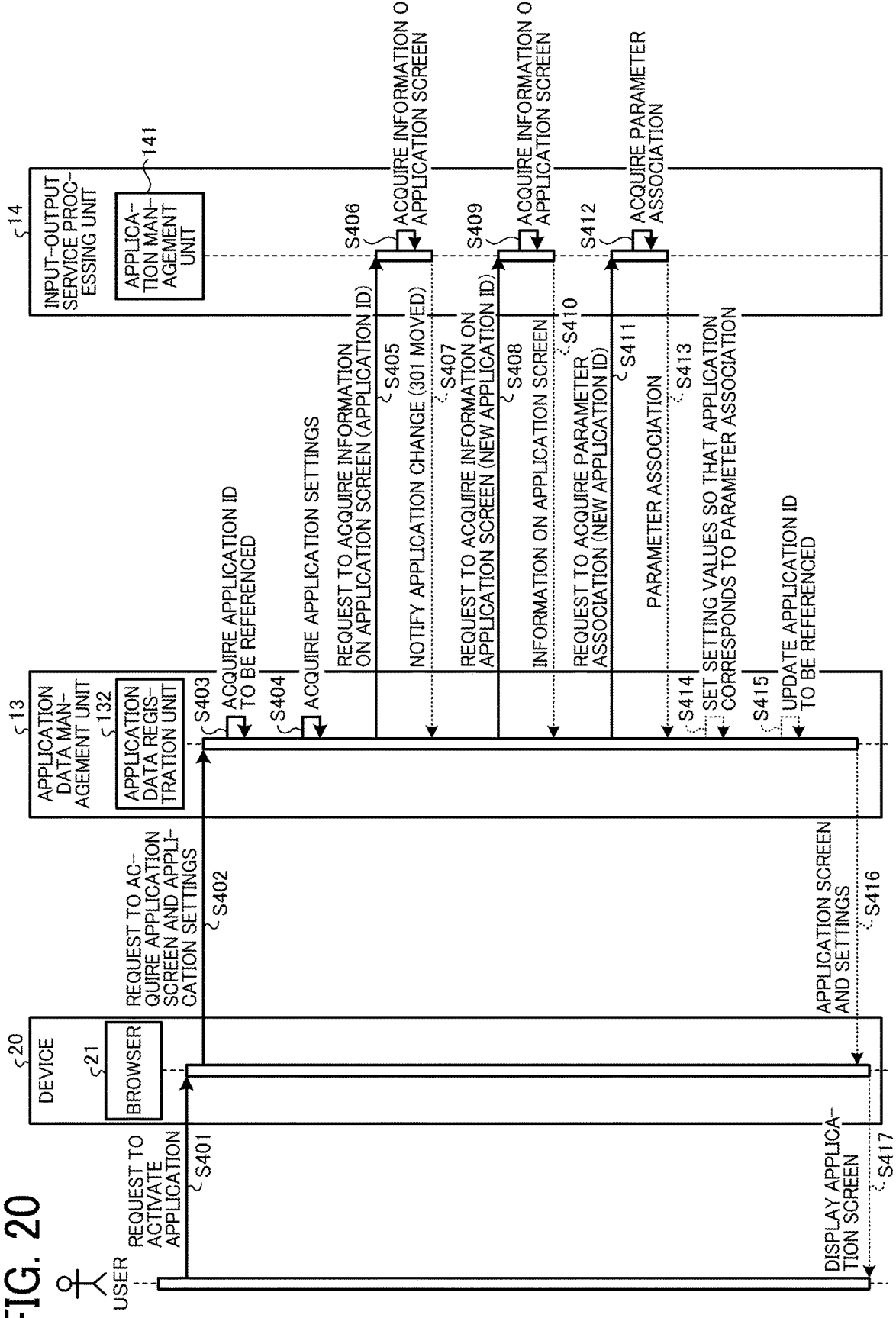
FIG. 20 is an example of a sequence diagram of using an integrated application of the fourth embodiment of this disclosure.

FIG. 20 is an example of a sequence diagram of using an integrated application of the fourth embodiment.

As illustrated in FIG. 20, when a user requests the browser 21 of the device 20 to activate an application (step S401), the browser 21 requests the application data registration unit 132 to acquire an application screen and application settings (step S402).

Then, the application data registration unit 132 acquires or obtains an application ID to be referenced (step S403).

Further, the application data registration unit 132 acquires or obtains the application settings (step S404).

Then, the application data registration unit 132 requests the application management unit 141 to acquire information on an application screen (step S405).

Then, the application management unit 141 acquires the information on the application screen (step S406), and then notifies an application change to the application data registration unit 132 (step S407). In step S407, the application management unit 141 returns "301 Moved" indicating that the application has been moved.

Then, the application data registration unit 132 requests the application management unit 141 to acquire information on application screen using a new application ID (step S408).

Then, the application management unit 141 acquires or obtains the information on the application screen (step S409), and then notifies the acquired information on the application screen to the application data registration unit 132 (step S410).

Then, the application data registration unit 132 requests to acquire or obtain a parameter association (step S411).

Then, the application management unit 141 acquires or obtains the parameter association (step S412), and returns the acquired parameter association (step S413).

Then, the application data registration unit 132 sets the setting value so that the application corresponds to the parameter association (step S414).

Then, the application data registration unit 132 updates the application ID to be referenced so that the subsequent parameter association will not occur (step S415).

Then, the application data registration unit 132 returns the application screen and the application settings to the browser 21 (step S416).

Then, the browser 21 displays the application screen (step S417).

FIG. 21 is an example of association of setting values of the parameters. FIG. 22 is an example of setting values of parameters before and after integrating the applications. If the parameter association illustrated in FIG. 21 is given, the setting values of the parameters before and after integrating the applications become as illustrated in FIG. 22, in which the setting value of the parameter of "storage.service" is maintained before and after integrating the applications.

Figure 23:
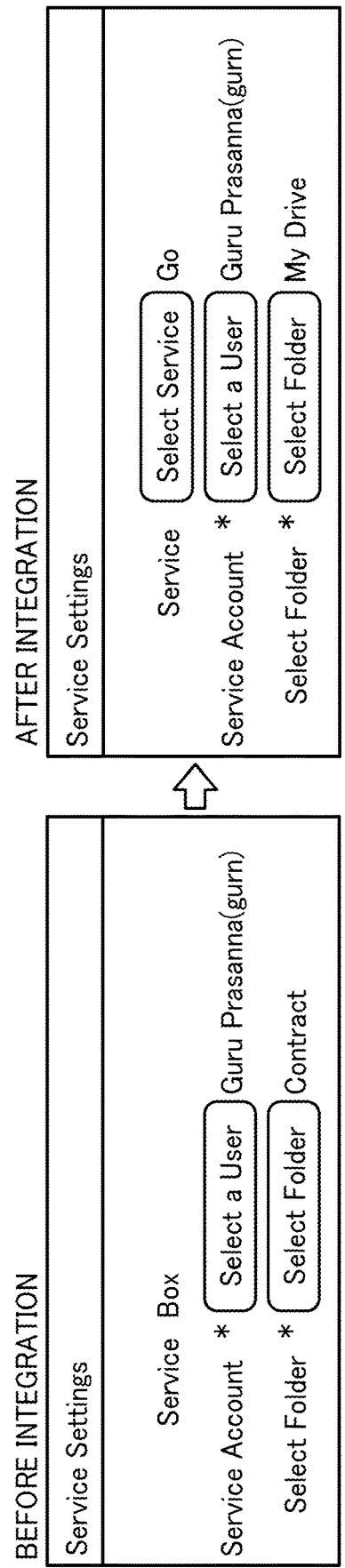
FIG. 23 is an example of parameter when a setting value is not maintained before and after integrating applications of the fourth embodiment of this disclosure.

On the other hand, FIG. 23 is an example of parameter when the setting value is not maintained before and after integrating the applications. If the parameter association illustrated in FIG. 21 is not given, the setting values of the parameters before and after integrating the applications become as illustrated in FIG. 23, in which the setting value of the parameter of "storage.service" is not maintained before and after integrating the applications.

As above described, when a change such as integrating a plurality of applications into one application is performed, the portal service unit 12 receives a designation of the association between the parameters before performing a changing operation of application and the parameters after performing a changing operation of application for one application.

Then, in accordance with the association received by the portal service unit 12, the input-output service processing unit 14 sets the setting value for each user that was set for the first parameter of each of a plurality of applications to the setting value of the second parameter of the one application.

Fifth Embodiment

Hereinafter, with reference to FIGS. 24 to 28, a description is given of the information processing system 1 according to a fifth embodiment, which is an example of dividing one application into a plurality of applications. As to the information processing system 1 of the fifth embodiment, one application of "Scan to Storage" having a storage selection function can be changed into a plurality of applications, such as "Scan to Go Drive with Go Keep" application and "Scan to Box with Box Notes" application, which are specialized in a service specific to each storage.

Figure 24:
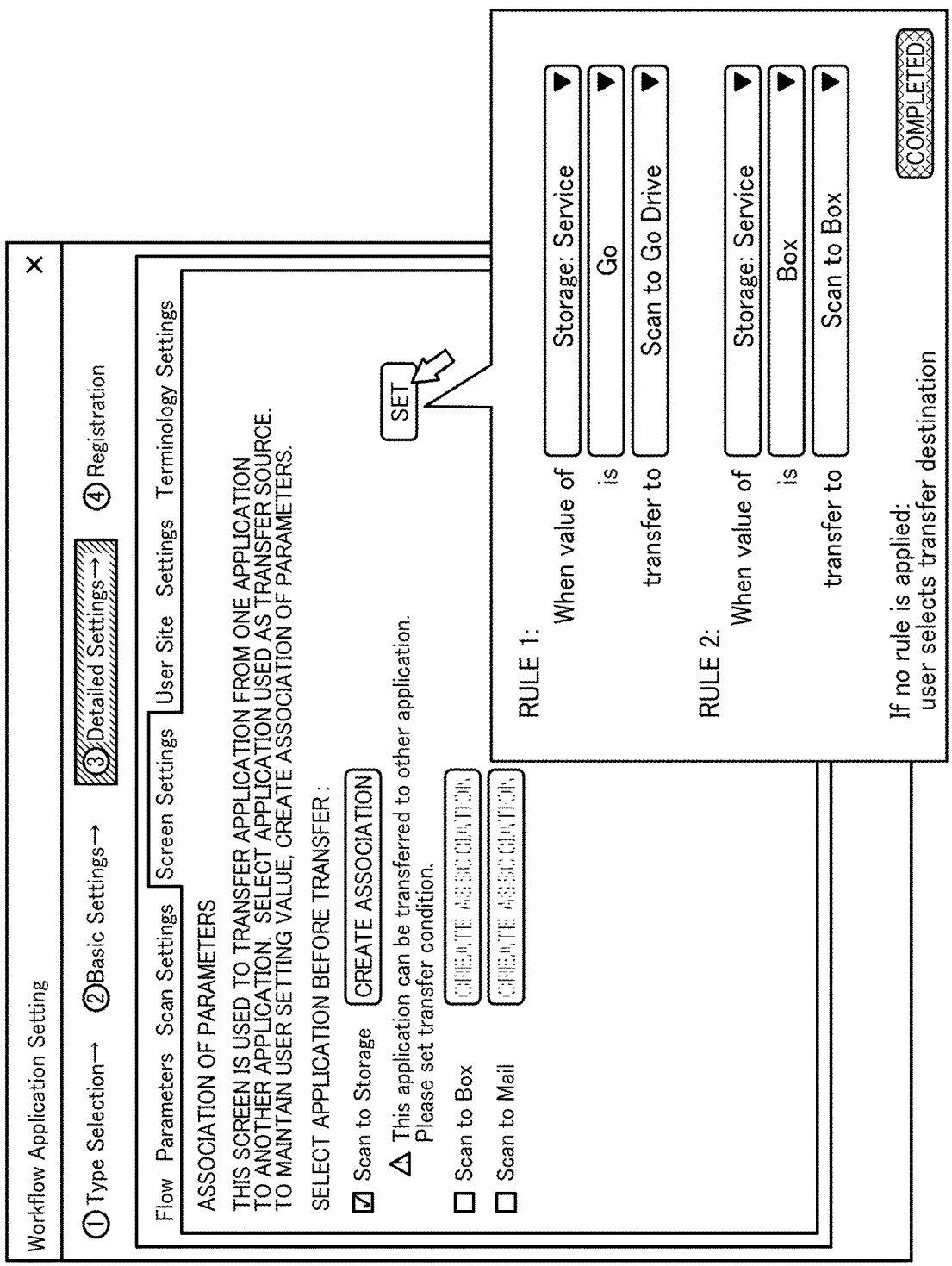
FIG. 24 is an example of screen used for dividing an application of a fifth embodiment of this disclosure.

FIG. 24 is an example of screen used for dividing an application. As illustrated in FIG. 24, the UI providing unit 121 displays a screen used for dividing or splitting an application displaying one or more check boxes used for designating a plurality of applications of change source (application of transfer source), and a pop-up that allows a user to set a plurality of applications of change destination.

In an example case in FIG. 24, a user is to replace "Scan to Storage" application being used by the user with "Scan to Go Drive" application that is being created. In this case, "Scan to Storage" application is also set to be replaceable with "Scan to Box" application that has already been created. Therefore, the UI providing unit 121 uses the pop-up that can set of change condition of "Scan to Storage" application to define which "Scan to Go Drive" application and "Scan to Box" application being created becomes a replacement of the storage service being selected by the user.

In the information processing system 1 according to the fifth embodiment, if the user selects a storage service other than these, or if the user has not yet selected the storage service, the user can select the replacement destination at the next activation timing or the next setting operation.

Figure 25:
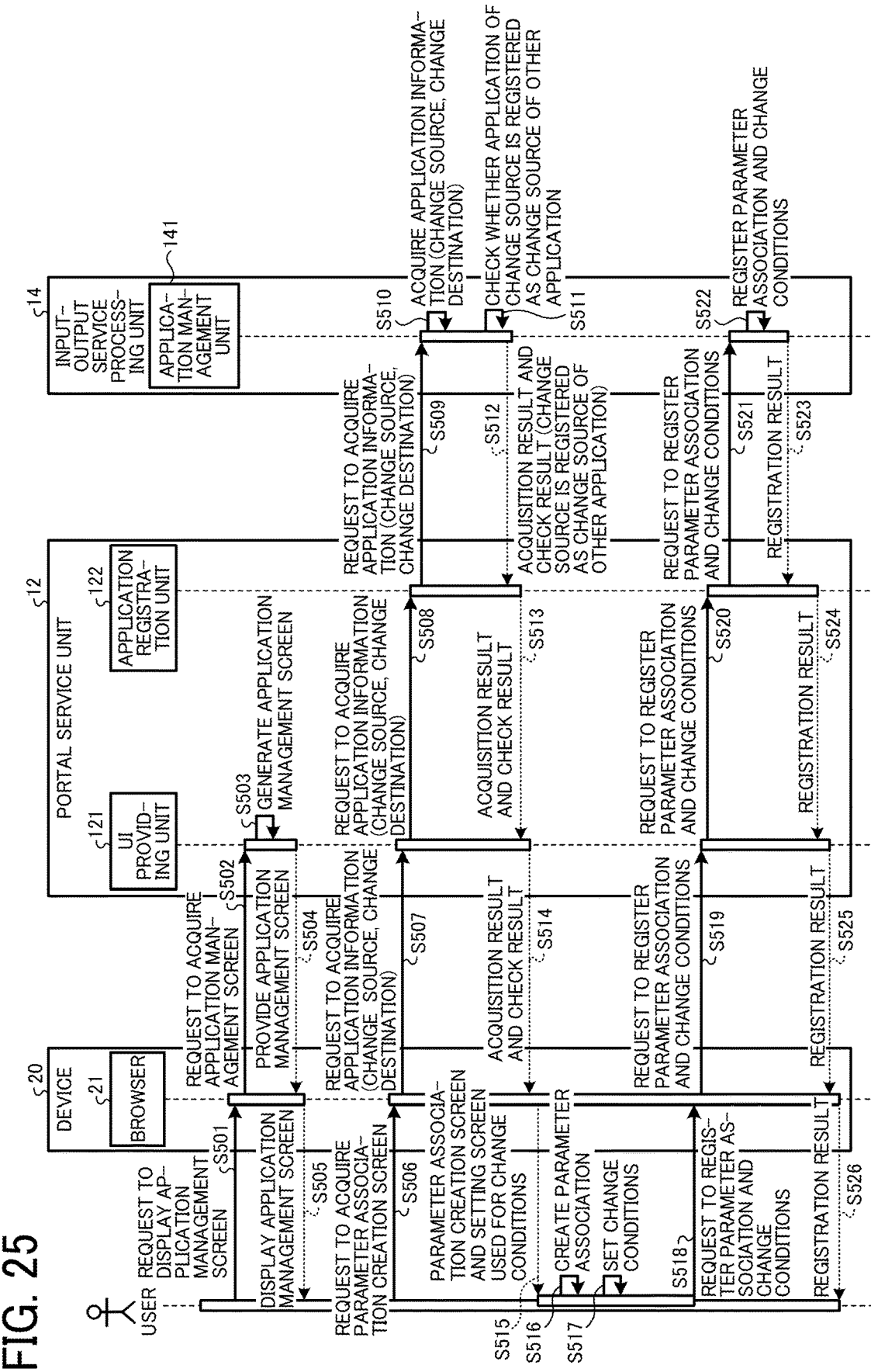
FIG. 25 is an example of a sequence diagram of dividing an application of the fifth embodiment of this disclosure.

FIG. 25 is an example of a sequence diagram of dividing an application of the fifth embodiment.

As illustrated in FIG. 25, a user requests the browser 21 of the device 20 to display an application management screen (step S501).

Then, the browser 21 of the device 20 requests the UI providing unit 121 of the portal service unit 12 to acquire the application management screen (step S502).

Then, the UI providing unit 121 generates the application management screen step S503).

Then, the UI providing unit 121 provides the generated application management screen to the browser 21 (step S504).

Then, the browser 21 of the device 20 displays the application management screen (step S505).

Then, the user requests the browser 21 to acquire the parameter association creation screen, in which the device 20 receives the display request of parameter association creation screen (step S506).

Then, the browser 21 of the device 20 requests the UI providing unit 121 to acquire application information (step S507).

Then, the UI providing unit 121 requests the application registration unit 122 to acquire the application information (step S508).

Then, the application registration unit 122 requests the application management unit 141 to acquire the application information (step S509).

Then, the application management unit 141 acquires or obtains the application information (step S510) and the application management unit 141 checks or confirms whether the application of change source is also registered as the change source for other application (step S511).

Then, the application management unit 141 returns an acquisition result and a check result (confirmation result) to the application registration unit 122 (step S512).

Then, the application registration unit 122 returns the acquisition result and the check result (confirmation result) to the UI providing unit 121 (step S513).

Then, the UI providing unit 121 returns the acquisition result to the browser 21 (step S514).

Then, the browser 21 displays the parameter association creation screen and a screen used for setting change conditions (change condition setting screen) (step S515).

Then, the user creates an association of the parameter before performing a changing operation of application and the parameter after performing a changing operation of application (step S516), and sets the change conditions (step S517).

Then, the user requests the browser 21 to register the parameter association and the change conditions, and then the device 20 receives the registration request of parameter association and change condition (step S518).

Then, the browser 21 of the device 20 requests the UI providing unit 121 to register the parameter association and the change conditions (step S519).

Then, the UI providing unit 121 requests the application registration unit 122 to register the parameter association and the change conditions (step S520).

Then, the application registration unit 122 requests the application management unit 141 to register the parameter association and the change conditions (step S521).

Then, the application management unit 141 registers the parameter association and the change conditions (step S522).

Then, the application management unit 141 returns a registration result to the application registration unit 122 (step S523).

Then, the application registration unit 122 returns the registration result to the UI providing unit 121 (step S524).

Then, the UI providing unit 121 returns the registration result to the browser 21 (step S525).

Then, the browser 21 displays the registration result (step S526).

Figure 26:
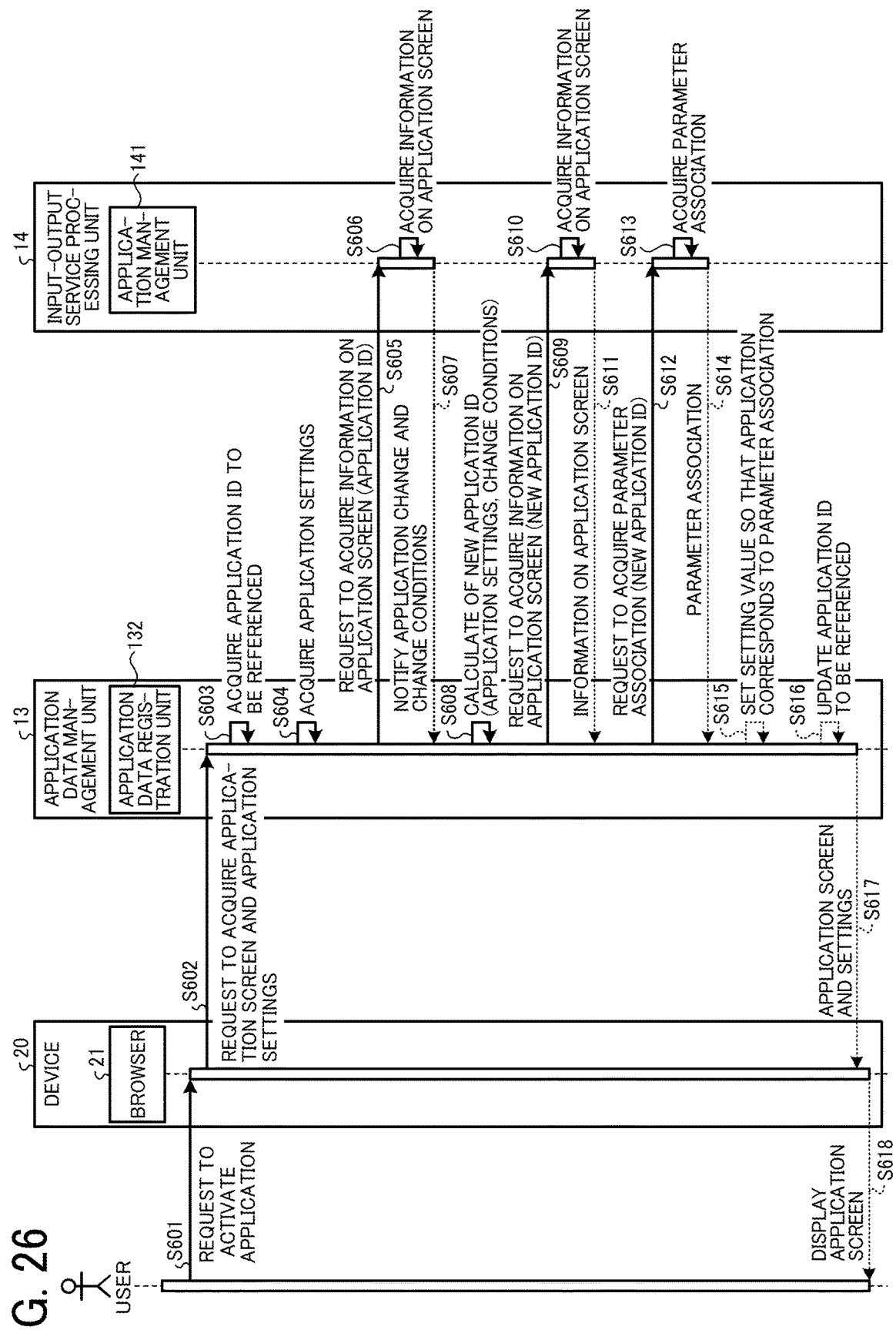
FIG. 26 is an example of a sequence diagram of utilizing an application after dividing of the fifth embodiment of this disclosure.

FIG. 26 is an example of a sequence diagram of utilizing an application after dividing in the fifth embodiment.

As illustrated in FIG. 26, a user requests the browser 21 to activate an application, and then the device 2 receives the application activation request (step S601).

Then, the browser 21 requests the application data registration unit 132 to acquire an application screen and application settings (step S602).

Then, the application data registration unit 132 acquires or obtains an application ID to be referenced (step S603).

Further, the application data registration unit 132 acquires or obtains the application settings (step S604).

Then, the application data registration unit 132 requests the application management unit 141 to acquire information on an application screen (step S605).

Then, the application management unit 141 acquires the information on the application screen (step S606), and notifies an application change and change Conditions to the application data registration unit 132 (step S607).

Then, the application data registration unit 132 calculates an ID of new application based on the application settings and the change conditions (step S608).

Then, the application data registration unit 132 requests the application management unit 141 to acquire information on the application screen using the new application ID (step S609).

Then, the application management unit 141 acquires or obtains the information on the application screen (step S610), and notifies the acquired information on application screen to the application data registration unit 132 (step S611).

Then, the application data registration unit 132 requests the application management unit 141 to acquire or obtain a parameter association (step S612).

Then, the application management unit 141 acquires or obtains the parameter association (step S613), and returns the acquired parameter association to the application data registration unit 132 (step S614).

Then, the application data registration unit 132 sets the setting value so that the application corresponds to the parameter association (step S615).

Then, the application data registration unit 132 updates the application ID to be referenced so that the subsequent parameter association will not occur (step S616).

Then, the application data registration unit 132 returns the application screen and the application settings to the browser 21 (step S617).

Then, the browser 21 of the device 20 displays the application screen (step S618).

Figure 27:
FIG. 27 is an example of association of setting values of parameters of the fifth embodiment of this disclosure.

FIG. 27 is an example of association of setting values of parameters. If the parameter association illustrated in FIG. 27 is given by the portal service unit 12, the setting value of the parameter of "storage.service" is maintained before and after the dividing.

Figure 28:
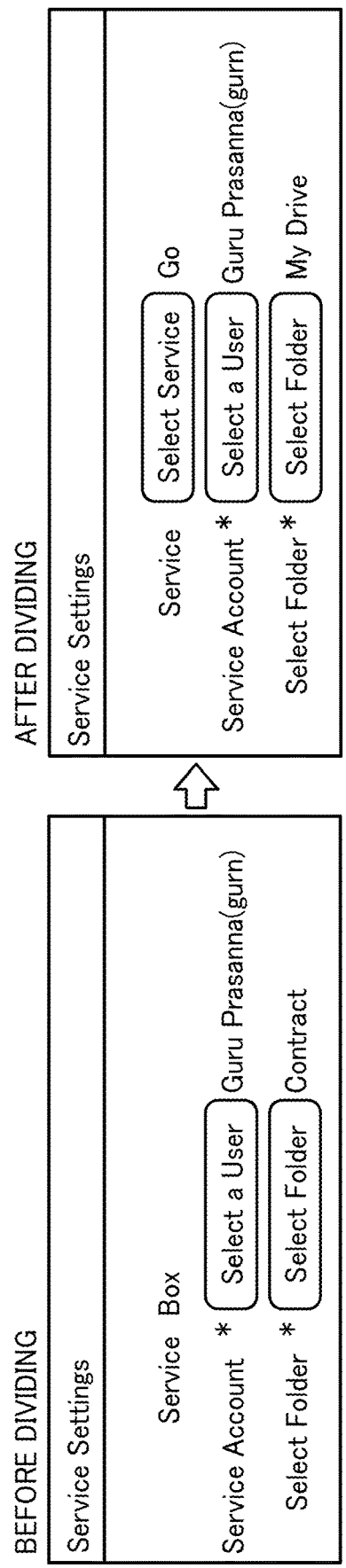
FIG. 28 is an example of parameter when a setting value is not maintained before and after dividing of the fifth embodiment of this disclosure.

On the other hand, FIG. 28 is an example of parameter when the setting value is not maintained before and after the dividing. If the parameter association illustrated in FIG. 27 is not given by the portal service unit 12, the setting values of the parameters before and after the dividing, become as illustrated in FIG. 28, in which the setting value of the parameter of "storage.service" is not maintained before and after the dividing.

As above described, when a change of dividing one application into a plurality of applications is performed, the portal service unit 12 receives a designation of the association between the parameters before performing a changing operation of application and the parameters after performing a changing operation of application for the plurality of applications.

Then, in accordance with the association received by the portal service unit 12, the input-output service processing writ 14 sets the setting value for each user that was set for the first parameter of one application to the setting value of the second parameter of the plurality of applications.

In the fourth embodiment, the integration of application is described, and in the fifth embodiment, the dividing of application is described, in which the number of applications before the changing and the number of applications after the changing may be many-to-many applications.

Figure 29:
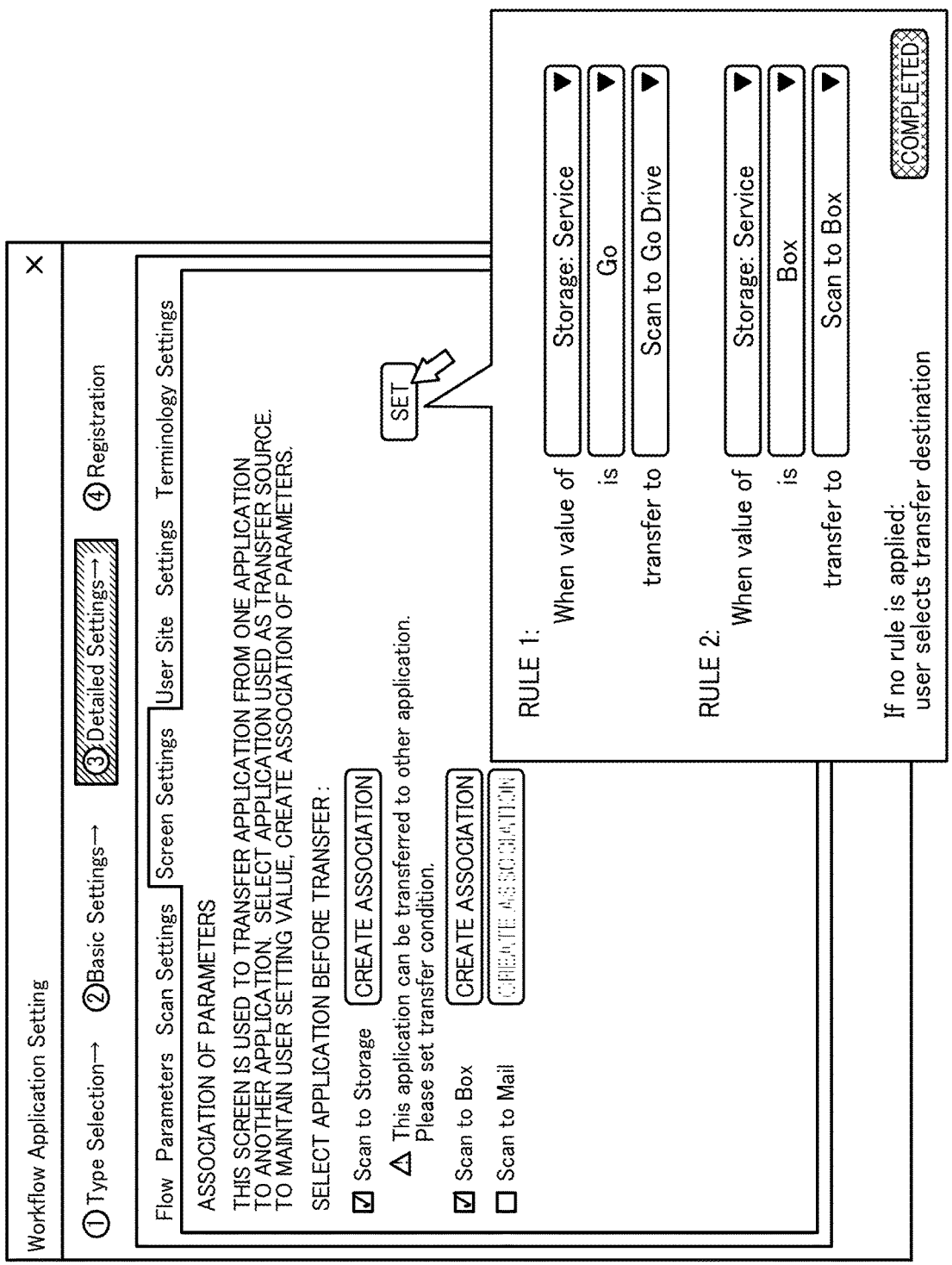
FIG. 29 is an example of a screen used for changing application under many-to-many applications state of the fifth embodiment of this disclosure.

FIG. 29 is an example of a screen used for changing application under the many-to-many applications. In this case too, the setting value can be maintained using the screen illustrated in FIG. 29 by performing the same sequence of the fifth embodiment.

Figure 30:
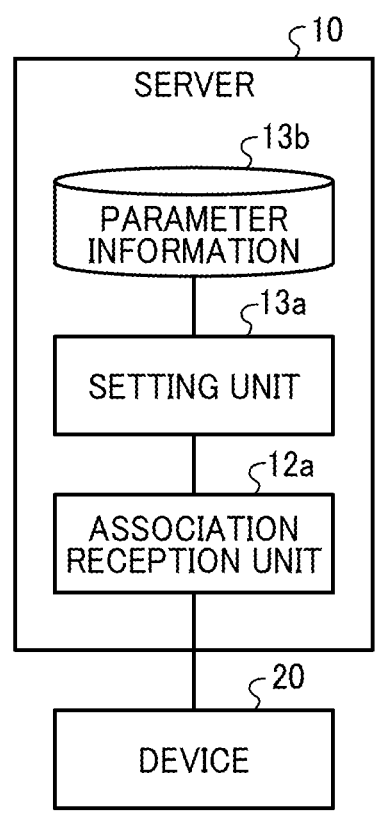
FIG. 30 is an example of functional block diagram of an information processing system according to the first embodiment of this disclosure.

FIG. 30 is an example of functional block diagram of an information processing system according to the first embodiment. FIG. 30 is a functional block diagram illustrating some functions of the server 10 described in FIG. 4. The server 10 includes, for example, association reception unit 12a, setting unit 13a, and parameter information 13b.

As indicated in FIG. 30, when the application is changed, the association reception unit 12a receives a designation of the association of parameters before and after performing a changing operation of application from the device 20. Then, in accordance with the association received by the association reception unit 12a, the setting unit 13a sets the setting value for each user that was set for the first parameter before performing a changing operation of application to the setting value of the second parameter, which is a parameter after performing a changing operation of application and associated with the first parameter.

In the above described embodiments, the portal service unit 12 functions as association reception unit. Further, the application data management unit 13 functions as a setting unit. Further, the parameter information 13b is retained in a given storage area provided for the server 10 or the like.

The conventional technology may have difficulty to maintain parameter setting values when an application is changed.

For example, if an application created by the conventional application creation tool is being used by a user, and then the application is changed, the conventional application creation tool resets the user setting values used for the application to the default values. In such a case, in order to return the user setting values to the state before the application was changed, the user needs to reset the setting values again, or the conventional application creation tool is required to create a dedicated program for restoring the user setting values and to deliver the dedicated program to the user.

As to the above described embodiments of information processing system, information processing apparatus, information processing method, and program can solve the above described issues. Specifically, the above described embodiments of information processing system, information processing apparatus, information processing method, and program can maintain setting value of parameter even when one application is changed.

Further, each of the functions of the above-described embodiments can be implemented by one or more processing circuits or circuitry. Processing circuitry includes a programmed processor, as a processor includes circuitry. The programmed processor implements each function by software, which can be implemented by the processor configured by the electronic circuit. Further, the processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

The apparatuses and devices described in the above described embodiments merely indicate one example of multiple computing environment that can implement the above described embodiments of this disclosure. In one embodiment, the server 10 may include a plurality of computing devices as a server cluster. The plurality of computing devices are configured to communicate with each other via any type of communication link, including network or shared memory, and perform the processing disclosed in this description. Similarly, the device 20 may include a plurality of computing devices configured to communicate with each other.

Further, the server 101 and the device 20 may be configured to share the processing steps disclosed in this description, such as sharing the processing steps using various combinations of the server 101 and the device 20 of FIG. 1. For example, a process performed by a given unit may be performed by the device 20. Similarly, a function of a given unit may be performed by the device 20. Further, each element of the server 10 and the device 20 may be integrated into one server, or may be divided into a plurality of devices.

Further, the device 20 is not limited to the MFP and PC, but can be any apparatus equipped with the communication function. The device 20 may be, for example, an output device such as projector (PJ), interactive white board (IWB) such as electronic information board having interactive communication function, digital signage, head-up display (HUD) device, industrial machinery, imaging device, sound collecting device, medical device, networked home appliance, automobile (e.g., connected car), notebook personal computer (PC), mobile phone, smartphone, tablet terminal, game console, personal digital assistant (PDA), digital camera, wearable personal computer (PC), and desktop PC.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. An information processing system, comprising:
a device; and
a server including
circuitry configured to
receive, when creating a new first application, a designation of an association between a first parameter used in the first application and a second parameter used in an existing second application for the device; and
in response to receiving the designation of the association, set a setting value of the first parameter for each user to a previously set setting value of the second parameter, from the existing second application, newly associated with the first parameter.

2. The information processing system according to claim 1,
wherein, in response to receiving the designation of the association, the circuitry is further configured to set the setting value of the first parameter to the setting value of the second parameter, which has a smallest Levenshtein distance for a parameter name with respect to the first parameter, the second parameter being one of one or more parameters having a type that matches a type of the first parameter.

3. The information processing system according to claim 1,
wherein the circuitry is further configured to provide a user interface (UI) that allows a user to associate the first parameter and the second parameter by manually moving an object corresponding to each of the first and second parameters on a screen.

4. The information processing system according to claim 1,
wherein the circuitry is further configured to provide a user interface (UI) that displays objects corresponding to each of a plurality of parameters, and displays one or more lines connecting the objects using a style reflecting plausibility of association between the objects.

5. The information processing system according to claim 1,
wherein, when a cursor is placed on an object corresponding to a parameter, the circuitry is further configured to provide a user interface (UI) that displays information about the object on which the cursor is placed.

6. The information processing system according to claim 5,
wherein when creating the first application includes integrating a plurality of second applications into the first application, the circuitry is further configured to, for each particular second application of the plurality of second applications,
receive the designation of the association of the first parameter and the second parameter from the device, and
set the setting value of the first parameter of the first application for each user to the setting value of the second parameter of the particular second application, in accordance with the received association.

7. The information processing system according to claim 1,
wherein when creating the first application includes dividing the second application into a plurality of first applications, the circuitry is further configured to, for each particular first application of the plurality of first applications,
receive the designation of the association of the first parameter and the second parameter from the device, and
set the setting value of the first parameter of the particular first application for each user to the setting value of the second parameter of the second application, in accordance with the received association.

8. An information processing apparatus, comprising:
circuitry configured to
receive, when creating a new first application, a designation of an association between a first parameter used in the first application and a second parameter used in an existing second application for the device; and
in response to receiving the designation of the association, set a setting value of the first parameter for each user to a previously set setting value of the second parameter, from the existing second application, newly associated with the first parameter.

9. A method of processing information, comprising:

receiving, by processing circuitry, when creating a new first application, a designation of an association between a first parameter used in the first application and a second parameter used in an existing second application for the device; and in response to receiving the designation of the association, setting, by the processing circuitry, a setting value of the first parameter for each user to a previously set setting value of the second parameter, from the existing second application, newly associated with the first parameter.

10. The information processing system of claim 1, wherein the circuitry is further configured to display a user interface allowing a user to create the new first application.

* * * * *